United States Patent
Christiansson et al.

(10) Patent No.: US 9,377,884 B2
(45) Date of Patent: Jun. 28, 2016

(54) MULTI-TOUCH DETECTION IN A TOUCH SYSTEM

(71) Applicant: FlatFrog Laboratories AB, Lund (SE)

(72) Inventors: Tomas Christiansson, Torna-Haellestad (SE); Mats Petter Wallander, Lund (SE); Peter Juhlin, Lund (SE); Andreas Johansson, Esloev (SE); Henrik Wall, Dalby (SE); Nicklas Ohlsson, Bunkeflostrand (SE)

(73) Assignee: FLATFROG LABORATORIES AB, Lund (SE)

( * ) Notice: Subject to any disclaimer, the term of this patent is extended or adjusted under 35 U.S.C. 154(b) by 81 days.

(21) Appl. No.: 14/349,003

(22) PCT Filed: Oct. 8, 2012

(86) PCT No.: PCT/SE2012/051073
§ 371 (c)(1),
(2) Date: Apr. 1, 2014

(87) PCT Pub. No.: WO2013/055282
PCT Pub. Date: Apr. 18, 2013

(65) Prior Publication Data
US 2014/0292701 A1    Oct. 2, 2014

Related U.S. Application Data

(60) Provisional application No. 61/545,659, filed on Oct. 11, 2011.

(30) Foreign Application Priority Data

Oct. 11, 2011   (SE) ...................................... 1150933

(51) Int. Cl.
*G06F 3/041* (2006.01)
*G06F 3/042* (2006.01)

(52) U.S. Cl.
CPC .............. *G06F 3/041* (2013.01); *G06F 3/0418* (2013.01); *G06F 3/0421* (2013.01); *G06F 2203/04104* (2013.01); *G06F 2203/04109* (2013.01)

(58) Field of Classification Search
None
See application file for complete search history.

(56) References Cited

U.S. PATENT DOCUMENTS

| 6,690,363 B2 | 2/2004 | Newton |
| 6,972,753 B1 | 12/2005 | Kimura et al. |

(Continued)

FOREIGN PATENT DOCUMENTS

| CN | 101788870 A | 7/2010 |
| EP | 2339437 A2 | 6/2011 |

(Continued)

OTHER PUBLICATIONS

International Search Report and Written Opinion dated Apr. 12, 2013 issued in corresponding International Application No. PCT/SE2012/051073.

(Continued)

*Primary Examiner* — Antonio Xavier
(74) *Attorney, Agent, or Firm* — Harness, Dickey & Pierce, P.L.C.

(57) ABSTRACT

Multi-touch sensitivity is enabled using a touch system that comprises a panel configured to conduct signals, e.g. by FTIR, from a plurality of incoupling points to a plurality of outcoupling points, thereby defining detection lines across the panel between pairs of incoupling and outcoupling points. A signal processor operates in a repeating sequence of iterations to obtain (50) a current signal value for each detection line, and generate (53, 53') a first interaction pattern and a second interaction pattern as a function of the current signal values, such that the first and second interaction patterns are reconstructed two-dimensional distributions of local interaction with the conducted signals across the surface portion, and represent changes in interaction on different time scales. Thereby, the movement of an object will affect how it is represented in each of the first and second interaction patterns.

19 Claims, 8 Drawing Sheets

(56) References Cited

U.S. PATENT DOCUMENTS

| | | | |
|---|---|---|---|
| 7,432,893 B2 | 10/2008 | Ma et al. | |
| 8,373,679 B2 | 2/2013 | Gepner et al. | |
| 8,407,606 B1* | 3/2013 | Davidson | G06F 3/0488 345/173 |
| 2002/0075243 A1 | 6/2002 | Newton | |
| 2006/0114237 A1 | 6/2006 | Crockett et al. | |
| 2007/0075648 A1 | 4/2007 | Blythe et al. | |
| 2007/0262969 A1 | 11/2007 | Pak | |
| 2008/0297482 A1* | 12/2008 | Weiss | G06F 3/04883 345/173 |
| 2009/0006292 A1* | 1/2009 | Block | G06F 3/04883 706/20 |
| 2009/0153519 A1 | 6/2009 | Suarez Rovere | |
| 2009/0251439 A1* | 10/2009 | Westerman | G06F 3/0235 345/175 |
| 2010/0073318 A1* | 3/2010 | Hu | G06F 3/044 345/174 |
| 2011/0084939 A1 | 4/2011 | Gepner et al. | |
| 2011/0122091 A1* | 5/2011 | King | G06F 3/0421 345/175 |
| 2011/0134079 A1 | 6/2011 | Stark | |
| 2011/0181552 A1 | 7/2011 | Goertz et al. | |
| 2011/0227874 A1* | 9/2011 | Fahraeus | G06F 3/0421 345/175 |
| 2012/0162144 A1 | 6/2012 | Fahraeus et al. | |
| 2012/0188206 A1* | 7/2012 | Sparf | G06F 3/042 345/175 |
| 2012/0200538 A1 | 8/2012 | Christiansson et al. | |
| 2012/0256882 A1 | 10/2012 | Christiansson et al. | |

FOREIGN PATENT DOCUMENTS

| | | |
|---|---|---|
| WO | WO-0207072 A2 | 1/2002 |
| WO | WO-2009/048365 A1 | 4/2009 |
| WO | WO-2009/077962 A2 | 6/2009 |
| WO | WO-2010/006882 A2 | 1/2010 |
| WO | WO-2010/006883 A2 | 1/2010 |
| WO | WO-2010/006884 A2 | 1/2010 |
| WO | WO-2010/006885 A2 | 1/2010 |
| WO | WO-2010/006886 A2 | 1/2010 |
| WO | WO-2010/064983 A2 | 6/2010 |
| WO | WO-2010/134865 A1 | 11/2010 |
| WO | WO-2011/028169 A1 | 3/2011 |
| WO | WO-2011/049512 A1 | 3/2011 |
| WO | WO-2011/049511 A1 | 4/2011 |
| WO | WO-2011/049512 A1 | 4/2011 |
| WO | WO-2011/049513 A1 | 4/2011 |
| WO | WO-2011/078769 A1 | 6/2011 |
| WO | WO-2011/139213 A1 | 11/2011 |
| WO | WO-2012/050510 A1 | 4/2012 |
| WO | WO-2013/048312 A2 | 2/2013 |

OTHER PUBLICATIONS

Supplementary European Search Report dated Apr. 13, 2015 issued in corresponding European Application No. 12839672.8.
Natterer, "The Mathematics of Computerized Tomography", New York: Society for Industrial and Applied Mathematics, 1986.
Kak and Slaney, "Principles of Computerized Tomographic Imaging", New York: IEEE Press, 1988.

* cited by examiner

MULTI-TOUCH DETECTION IN A TOUCH SYSTEM

CROSS-REFERENCE TO RELATED APPLICATIONS

This application is a national phase under 35 U.S.C. §371 of PCT International Application No. PCT/SE2012/051073 which has an International filing date of Oct. 8, 2012, which claims priority to Sweden patent application number SE 1150933-8 filed Oct. 11, 2011 and U.S. provisional patent application No. 61/545,659 filed Oct. 11, 2011.

TECHNICAL FIELD

The present invention relates to touch sensing systems and data processing techniques in relation to such systems.

BACKGROUND ART

Touch sensing systems ("touch systems") are in widespread use in a variety of applications. Typically, the touch sensing systems are actuated by a touch object such as a finger or stylus, either in direct contact, or through proximity (i.e. without contact), with a touch surface. Touch sensing systems are for example used as touch pads of laptop computers, in control panels, and as overlays to displays on e.g. hand held devices, such as mobile telephones. A touch panel that is overlaid on or integrated in a display is also denoted a "touch screen". Many other applications are known in the art.

To an increasing extent, touch systems are designed to be able to detect two or more touches simultaneously, this capability often being referred to as "multi-touch" in the art.

There are numerous known techniques for providing multi-touch sensitivity, e.g. by using cameras to capture light scattered off the point(s) of touch on a touch panel, or by incorporating resistive wire grids, capacitive sensors, strain gauges, etc into a touch panel.

WO2010/064983 and WO2010/06882 disclose another type of multi-touch system which is based on frustrated total internal reflection (FTIR). Light sheets are coupled into a panel to propagate inside the panel by total internal reflection. When an object comes into contact with a touch surface of the panel, two or more light sheets will be locally attenuated at the point of touch. Arrays of light sensors are located around the perimeter of the panel to detect the received light for each light sheet. Data from the light sensors may be processed into logarithmic transmission values, which are input into an image reconstruction algorithm that generates a two-dimensional distribution of attenuation values over the touch surface. This enables determination of shape, position and size of multiple touches.

A similar type of multi-touch system is disclosed in WO2009/077962.

As the availability of multi-touch systems increases, and in particularly as these systems are made available in a wide range of sizes and enabling an increased number of simultaneous touches, it can be foreseen that software applications with advanced user interaction will be developed to be run on devices with these types of touch systems. For example, a user may be allowed to enter advanced multi-touch gestures or control commands, in which fingers on one or both hands are dragged across a touch surface, and it may be possible for several users to work concurrently on the touch surface, either in different application windows, or in a collaborative application window.

The touches need to be detected against a background of measurement noise and other interferences, e.g. originating from ambient light, fingerprints and other types of smear on the touch surface, vibrations, detection artifacts, etc. The influence of measurement noise and interferences may vary not only over time but also within the touch surface, making it difficult to properly detect the touches on the touch surface at all times. Furthermore, the degree of interaction between a touching object and the touch surface may vary both over time and between different objects. For example, the interaction may depend on if an object is tapped, dragged or held in a fixed position onto the touch surface. Different objects may yield different degree of interaction, e.g. the degree of interaction may vary between fingers of a user, and even more so between the fingers of different users.

The combination of several touches, complex gestures as well as temporal and spatial variations in degree of interaction, background, and noise will make the identification of touches a more demanding task. The user experience will be greatly hampered if, e.g., an ongoing gesture on a touch screen is interrupted by the system failing to detect certain touches during the gesture.

SUMMARY

It is an objective of the invention to at least partly overcome one or more limitations of the prior art.

In view of the foregoing, one objective is to enable a consistent user experience when interacting with a multi-touch system.

This and other objectives, which may appear from the description below, are at least partly achieved by means of a method of enabling touch determination, a computer program product, devices for enabling touch determination, and touch-sensitive apparatuses according to the independent claims, embodiments thereof being defined by the dependent claims.

A first aspect of the invention is a method of enabling touch determination based on an output signal from a touch-sensitive apparatus. The touch-sensitive apparatus comprises: a panel configured to conduct signals from a plurality of incoupling points to a plurality of outcoupling points, thereby defining detection lines that extend across a surface portion of the panel between pairs of incoupling and outcoupling points, at least one signal generator coupled to the incoupling points to generate the signals, and at least one signal detector coupled to the outcoupling points to generate the output signal which is indicative of one or more objects touching the surface portion. The method comprises the steps of, in a sequence of iterations: obtaining, based on the output signal, a current signal value for each detection line, and generating a first interaction pattern and a second interaction pattern as a function of the current signal values, such that the first and second interaction patterns are reconstructed two-dimensional distributions of local interaction with the conducted signals across the surface portion, wherein the first and second interaction patterns are generated to represent changes in interaction on different time scales.

By generating the interaction patterns on different time scales, the movement of the touching objects will influence how they are represented in the first and second interaction patterns, respectively. Thus, to the extent that the movement affects how much an object interacts with the conducted signals, the first aspect enables the resulting variations in interaction to be at least partly separated into the first and second interaction patterns. The generation of the first and second interaction patterns may thus be separately optimized with respect to the objects to be detected, and the touch detection may be based on a combined analysis of the first and second interaction patterns (generated in one and the same iteration or in different iterations). It is realized that this may improve the detection of touches whenever the degree of interaction varies between objects on the surface portion. This in turn enables a more consistent user experience.

The method of the first aspect may thus further comprise a step of providing the first and second interaction patterns for determination of current touch data representing one or more objects touching the surface portion. A still further step may comprise outputting at least a subset of the current touch data.

In one embodiment, the first interaction pattern is generated to represent a factual touch interaction across the surface portion at the current iteration. Thus, the first interaction pattern may be seen to represent an instant "snapshot" of the distribution of touch-generated interaction across the surface portion. Thereby, the first interaction pattern will represent changes in interaction on a long time scale, e.g. all touch-generated interaction changes since startup or calibration of the touch-sensitive apparatus.

In one embodiment, the second interaction pattern is generated to indicate temporal changes in interaction caused by adding a further object to the surface portion ("touch down"), movement of the one or more objects on the surface portion, and removal of the one or more objects from the surface portion ("touch up"). Thereby, the second interaction pattern will represent changes in interaction on a comparatively short time scale. By proper choice of the time scale, it is possible to generate the second interaction pattern without having to compensate for contaminations that are accumulated on the surface portion, e.g. if the time scale is selected such that the change in interaction caused by added contamination is small compared to the change in touch-generated interaction.

In one embodiment, the second interaction pattern is generated to represent changes in interaction occurring on a time scale in the approximate range of 5 ms-5 s, and the first interaction pattern is generated to represent changes on a longer time scale than the second interaction pattern.

In one embodiment, the second interaction pattern is generated to represent a change in accumulated interaction on the surface portion between the current iteration and a preceding iteration. In an alternative embodiment, the second interaction pattern is generated to represent a difference between an accumulated interaction on the surface portion at the current iteration and a time average of accumulated interaction on the surface portion.

In one embodiment, the step of generating the second interaction pattern comprises: retrieving a current reference value for each detection line, the current reference value being representative of the current signal value obtained in one or more preceding iterations in the sequence of iterations; calculating a change value for each detection line as a function of the current signal value and the current reference value; and operating a reconstruction function on the change values to generate the second interaction pattern. Since the change values typically indicate changes in interaction on a comparatively short time scale, the change values are typically smaller in magnitude than the input data used for generating the first interaction pattern. It is realized that this enables the generation of the second interaction pattern to use a lower bit resolution than the generation of the first interaction pattern, resulting in improved processing efficiency. Alternatively, this may enable the second pattern to be generated with an improved bit resolution compared to the first interaction pattern.

It should be noted that the step of generating "a signal value for each detection line" is to be interpreted as relating to the detection lines deemed relevant or useful for generating the first and second interaction patterns. Thus, the touch-sensitive apparatus may actually define further detection lines, which are not used in the generation step during one or more, or all, iterations of the method.

In one embodiment, the first and second interaction patterns are generated by generating formatted input data as a function of the current signal values and operating at least one reconstruction function on the formatted input data.

Each of the first and second interaction patterns comprises a two-dimensional distribution of "interaction values" that represent the local interaction with the conducted signals across the surface portion. The interaction values may be given in different formats, but typically represent local attenuation or local transmission in a broad sense.

The format of the formatted input data is typically adapted to the reconstruction function so as to yield the interaction values in a desired format in the first and second interaction patterns. For example, if the interaction values represent local attenuation, the formatted input data may be generated to represent signal attenuation.

In one embodiment, the step of generating the second interaction pattern comprises: enhancing weak interactions over strong interactions in the second interaction pattern. This may be achieved by manipulating the formatted input data to the reconstruction function so as to cause a desired distortion of the second interaction pattern aimed at enhancing certain features.

In one embodiment, the method further comprises a step of obtaining a measured change in interaction for each detection line, while the step of enhancing weakly interacting touches comprises a step of actively modifying the measured change in interaction for at least a subset of the detection lines. The measured change may be actively modified to change the mutual relation in the measured change among the different detection lines. The step of enhancing may comprise a step of relatively decreasing the measured change for the detection lines with the highest measured change.

In a specific embodiment, the step of enhancing comprises a step of applying a predetermined re-scaling function to the measured change for the detection lines. This is a simple way of modifying the measured change for the detection lines.

In another specific embodiment, the method further comprises the steps of obtaining a current reference pattern on the surface portion; identifying a location of a strongly interacting touch in the current reference pattern; and identifying a set of detection lines intersecting said location; wherein the measured change is actively modified for the set of detection lines. This approach enables the modification to affect only relevant detection lines. The current reference pattern may e.g. be a differential reference pattern generated as a function of the measured change. In one embodiment, the active modification comprises at least one of: changing the measured change for the set of intersecting detection lines by a predetermined amount or fraction, setting the measured change for the set of intersecting detection lines to a predefined value according to a predefined criterion, and decreasing the measured change for the set of intersecting detection lines by an estimated contribution of the strong interactions.

In one embodiment, the method further comprises: jointly processing the first and second interaction patterns for determination of touch data representing one or more touches on the surface portion. The step of jointly processing may comprise the further steps of matching a first set of peaks identified in the first interaction pattern and a second set of peaks identified in the second interaction pattern to touch data of existing touches stored in a history list, and updating the history list based on said matching. The step of updating may comprise, for each existing touch that matches at least one peak in the first and second sets of peaks, determining current touch data as a function of said at least one peak and changing the touch data in the history list to reflect the current touch data. The step of updating may comprise, for each existing touch that fails to match the first and second sets of peaks, removing the existing touch from the history list. The step of updating may comprise, for each peak in at least one of the first and second sets of peaks that fails to match an existing touch, determining current touch data as a function of the peak and adding the current touch data to represent a new existing touch in the history list.

The first and second interaction patterns that are "jointly processed" may be generated in one and the same iteration (the current iteration). In alternative embodiments, the touch data is determined by "jointly processing" first and second interaction patterns that are generated in different iterations. Such an embodiment may improve the response time of the method, since only one interaction pattern needs to the generated before touch data can be determined for a current iteration. In a specific embodiment, the touch data is generated based on a first set of peaks identified in a first interaction pattern generated in a preceding iteration (e.g. the immediately preceding iteration), and a second set of peaks identified in a second interaction pattern generated in the current iteration. This may serve to further improve the response time when the second interaction pattern is generated to represent interaction changes on a shorter time scale, since short-term changes in interaction (e.g. caused by fast movements, touch up and touch down) will be quickly represented in the touch data.

The current touch data may be determined, if the existing touch matches a first peak in the first set of peaks and a second peak in the second set of peaks, by applying a set of heuristics which is dependent on at least one of an estimated velocity of the existing touch and a distance between the first and second peaks. The set of heuristics may comprise at least one of a high velocity heuristic which causes the current touch data to be determined as a function of the second peak and not the first peak, an intermediate velocity heuristic which causes the current touch data to be determined as a function of the first peak and the second peak, a low velocity heuristic which causes the current touch data to be determined as a function of the first peak and not the second peak, a large distance heuristic which causes the current touch data to be determined as a function of the second peak and not the first peak, an intermediate distance heuristic which causes the current touch data to be determined as a function of the first peak and the second peak, and a small distance heuristic which causes the current touch data to be determined as a function of the first peak and not the second peak.

A second aspect of the invention is a computer program product comprising computer code which, when executed on a data-processing system, is adapted to carry out the method of the first aspect.

A third aspect of the invention is a device for enabling touch determination based on an output signal from the above-mentioned touch-sensitive apparatus. The device comprises: a signal processor configured to, repeatedly in a sequence of iterations: obtain, based on the output signal, a current signal value for each detection line, and generate a first interaction pattern and a second interaction pattern as a function of the current signal values, such that the first and second interaction patterns are reconstructed two-dimensional distributions of local interaction with the conducted signals across the surface portion, wherein the first and second interaction patterns are generated to represent changes in interaction on different time scales.

A fourth aspect of the invention is a device for enabling touch determination based on an output signal from a touch-sensitive apparatus. The touch-sensitive apparatus comprises: a panel configured to conduct signals from a plurality of incoupling points to a plurality of outcoupling points, thereby defining detection lines that extend across a surface portion of the panel between pairs of incoupling and outcoupling points, signal generating means coupled to the incoupling points to generate the signals, and signal detecting means coupled to the outcoupling points to generate the output signal which is indicative of one or more objects touching the surface portion. The device is operable in a sequence of iterations and comprises: means for obtaining, in each iteration and based on the output signal, a current signal value for each detection line, and means for generating a first interaction pattern and a second interaction pattern as a function of the current signal values, such that the first and second interaction patterns are reconstructed two-dimensional distributions of local interaction with the conducted signals across the surface portion, wherein the first and second interaction patterns are generated to represent changes in interaction on different time scales.

A fifth aspect of the invention is a touch-sensitive apparatus, comprising: a panel configured to conduct signals from a plurality of incoupling points to a plurality of outcoupling points, thereby defining detection lines that extend across a surface portion of the panel between pairs of incoupling and outcoupling points; means for generating the signals at the incoupling points; means for generating an output signal based on detected signals at the outcoupling points, the output signal being indicative of one or more objects touching the surface portion; and a device for enabling touch determination according to the fourth or fifth aspect.

A sixth aspect of the invention is a touch-sensitive apparatus, comprising: a panel configured to conduct signals from a plurality of incoupling points to a plurality of outcoupling points, thereby defining detection lines that extend across a surface portion of the panel between pairs of incoupling and outcoupling points; at least one signal generator coupled to the incoupling points to generate the signals; at least one signal detector coupled to the outcoupling points to generate an output signal which is indicative of one or more objects touching the surface portion; and a signal processor connected to receive the output signal and configured to, repeatedly in a sequence of iterations: obtain, based on the output signal, a current signal value for each detection line, and generate a first interaction pattern and a second interaction pattern as a function of the current signal values, such that the first and second interaction patterns are reconstructed two-dimensional distributions of local interaction with the conducted signals across the surface portion, wherein the first and second interaction patterns are generated to represent changes in interaction on different time scales.

Any one of the above-identified embodiments of the first aspect may be adapted and implemented as an embodiment of any one of the second to sixth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1:
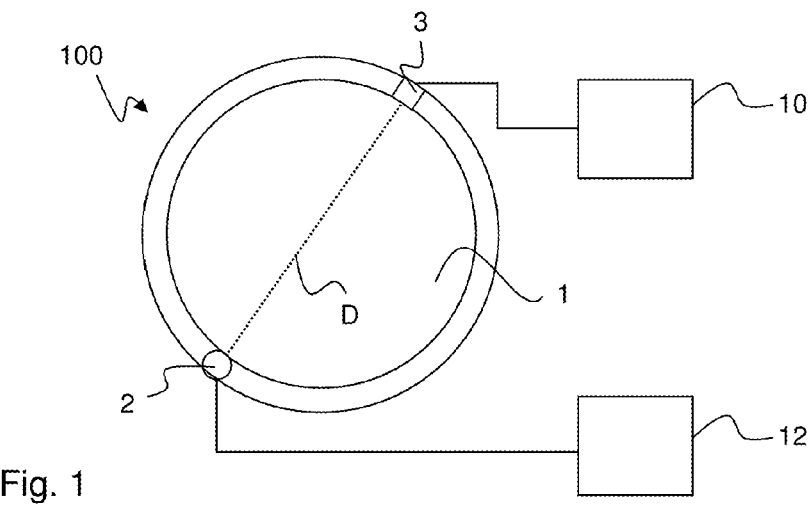
FIG. 1 is a plan view of a touch-sensitive apparatus.

Before describing embodiments of the invention, a few definitions will be given.

A "touch object" or "touching object" is a physical object that touches, or is brought in sufficient proximity to a touch surface so as to be detected by one or more sensors in the touch system. The physical object may be animate or inanimate.

An "interaction" occurs when the touch object affects a parameter measured by the sensor.

An "interaction strength" is a relative or absolute measure of the degree of interaction.

An "interaction pattern" is a two-dimensional distribution of interaction across the touch surface, or a portion thereof.

A "touch" denotes a point of interaction as seen in the interaction pattern. A touch may be associated with different touch parameters, such as a location on the touch surface in any coordinate system, an interaction strength, a size (e.g. diameter, area, etc), a shape, etc.

A "frame" or "iteration" denotes a repeated event starting with data collection and ending with determination of touch data. The touch data may comprise any combination of a location on the touch surface, a size, a shape and a pressure between the touching object and the touch surface.

As used herein, a "trace" is information about the temporal history of an interaction. Touches from an interaction detected in a sequence of frames, i.e. at different points in time, are collected into a trace.

A trace may be associated with different trace parameters, such as an age, a location, a location history, a size, a shape, etc. The "age" of a trace indicates how long the trace has existed, and may be given as a number of frames, the frame number of the earliest touch in the trace, a time period, etc. The "location" of the trace is given by the location of the most recent touch in the trace, and the "size" of a trace denotes the size of the most recent touch in the trace. The "location history" denotes at least part of the spatial extension of the trace across the touch surface, e.g. given as the locations of the latest few touches in the trace, or the locations of all touches in the trace, a curve approximating the shape of the trace, or a Kalman filter.

Throughout the following description, the same reference numerals are used to identify corresponding elements.

1. Touch-Sensitive Apparatus

FIG. 1 illustrates a touch-sensitive apparatus 100 which is based on the concept of transmitting energy of some form across a touch surface 1, such that an object that is brought into close vicinity of, or in contact with, the touch surface 1 causes a local decrease in the transmitted energy. The touch-sensitive apparatus 100 includes an arrangement of emitters and sensors, which are distributed along the periphery of the touch surface 1. Each pair of an emitter and a sensor defines a detection line, which corresponds to the propagation path for an emitted signal from the emitter to the sensor. In FIG. 1, only one such detection line D is illustrated to extend from emitter 2 to sensor 3, although it should be understood that the arrangement typically defines a dense grid of intersecting detection lines, each corresponding to a signal being emitted by an emitter and detected by a sensor. Any object that touches the touch surface along the extent of the detection line D will thus decrease its energy, as measured by the sensor 3. Thus, a touch on the touch surface 1 by an object results in an attenuation of one or more detection lines.

The arrangement of sensors 3 is electrically connected to a signal processor 10, which samples and processes an output signal from the arrangement. The output signal is indicative of the received signal energy or signal power at each sensor 3. As will be explained below, the signal processor 10 may be configured to process the output signal so as to recreate a distribution of interaction values (for simplicity, referred to as an "interaction pattern" or "attenuation field" in the following) across the touch surface 1. The interaction pattern may be represented in many different ways, e.g. as interaction values arranged in a regular x-y-grid, such as in an ordinary digital image, although other types of grids are conceivable, e.g. hexagonal patterns or triangular meshes. The interaction pattern may be further processed by the signal processor 10 or by a separate device (not shown) for touch determination, which may involve extraction of touch data, such as a position (e.g. x, y coordinates), a shape or an area of each touching object.

In the example of FIG. 1, the touch-sensitive apparatus 100 also includes a controller 12 which is connected to selectively control the activation of the emitters 2 and, possibly, the readout of data from the detectors 3. The signal processor 10 and the controller 12 may be configured as separate units, or they may be incorporated in a single unit. One or both of the signal processor 10 and the controller 12 may be at least partially implemented by software executed by a processing unit 14.

Generally, the touch-sensitive apparatus 100 (the touch surface 1) may be of any shape, such as circular, elliptical or polygonal, including rectangular. The touch-sensitive apparatus 100 may be designed to be overlaid on or integrated in a display device or monitor.

The touch-sensitive apparatus 100 may be configured to permit transmission of energy in one of many different forms. The emitted signals may thus be any radiation or wave energy that can travel in and across the touch surface 1 including, without limitation, light waves in the visible or infrared or ultraviolet spectral regions, electrical energy, electromagnetic or magnetic energy, or sonic and ultrasonic energy or vibration energy.

Figure 2A:
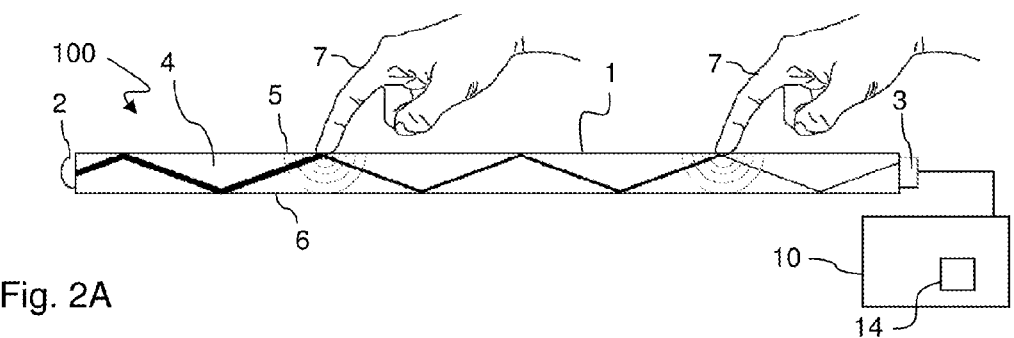
FIGS. 2A-2B are side and top plan views of touch-sensitive systems operating by frustrated total internal reflection (FTIR).

In the following, an example embodiment based on propagation of light will be described. FIG. 2A is a side view of a touch-sensitive apparatus 100 which includes a light transmissive panel 4, one or more light emitters 2 (one shown) and one or more light sensors 3 (one shown). The panel 4 is made of solid material in one or more layers and defines two opposite and generally parallel surfaces 5, 6 and may be planar or curved. The panel 4 defines an internal radiation propagation channel, in which light propagates by internal reflections. In the example of FIG. 2A, the propagation channel is defined between the boundary surfaces 5, 6 of the panel 4, where the top surface 5 allows the propagating light to interact with touching objects 7 and thereby defines the touch surface 1. This is achieved by injecting the light into the panel 1 such that the light from the emitter(s) 2 is reflected by total internal reflection (TIR) in the touch surface 1 as it propagates through the panel 4. The light may be reflected by TIR in the bottom surface 6 or against a reflective coating thereon. It is also conceivable that the propagation channel is spaced from the bottom surface 6, e.g. if the panel comprises multiple layers of different materials. The sensors 3 are arranged at the periphery of the panel 4 to generate a respective measurement signal which is indicative of the energy of received light.

As shown in FIG. 2A, the light may be coupled into and out of the panel 4 directly via the edge portion that connects the top and bottom surfaces 5, 6 of the panel 4. Alternatively, not shown, a separate coupling element (e.g. in the shape of a wedge) may be attached to the edge portion or to the top or bottom surface 5, 6 of the panel 4 to couple the light into and/or out of the panel 4. When the object 7 is brought sufficiently close to the boundary surface, part of the light may be scattered by the object 7, part of the light may be absorbed by the object 7, and part of the light may continue to propagate in the panel 4 in its original direction across the panel 4. Thus, when the object 7 touches a boundary surface of the panel (e.g. the top surface 5), the total internal reflection is frustrated and the energy of the transmitted light is decreased. This type of touch-sensitive apparatus is denoted an "FTIR system" (FTIR—Frustrated Total Internal Reflection) in the following.

Figure 2B:
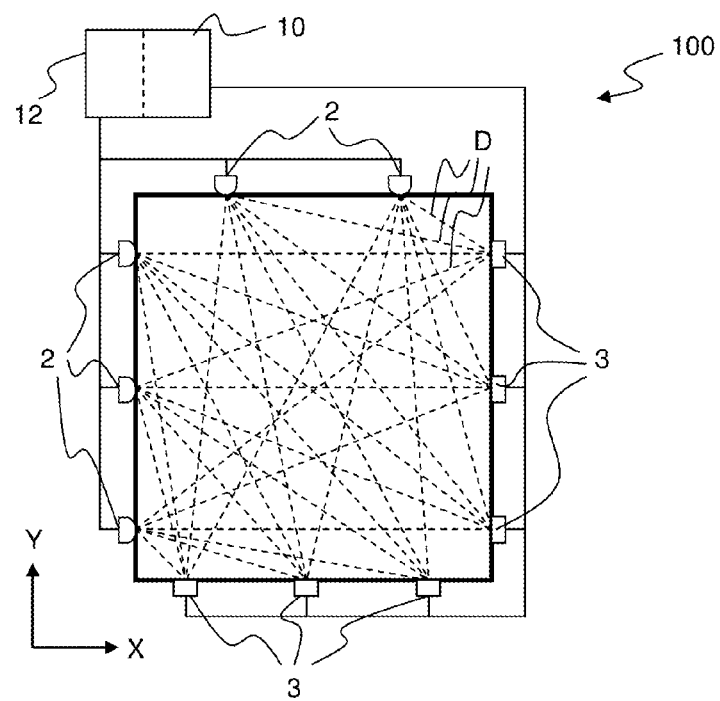

The FTIR system 100 may be operated to measure the energy of the light transmitted through the panel 4 on a plurality of detection lines. This may, e.g., be done by activating a set of spaced-apart emitters 2 to generate a corresponding number of light sheets inside the panel 4, and by operating a set of sensors 3 to measure the transmitted energy of each light sheet. Such an embodiment is illustrated in FIG. 2B, where each emitter 2 generates a beam of light that expands in the plane of the panel 4 while propagating away from the emitter 2. Each beam propagates from one or more entry or incoupling points within an incoupling site on the panel 4. Arrays of light sensors 3 are located around the perimeter of the panel 4 to receive the light from the emitters 2 at a number of spaced-apart outcoupling points within an outcoupling site on the panel 4. It should be understood that the incoupling and outcoupling points merely refer to the position where the beam enters and leaves, respectively, the panel 4. Thus, one emitter/sensor may be optically coupled to a number of incoupling/outcoupling points. In the example of FIG. 2B, however, the detection lines D are defined by individual emitter-sensor pairs. This implementation and further variants are disclosed in more detail in Applicant's WO2010/064983, which is incorporated herein in its entirety by this reference.

It is to be understood that FIG. 2 merely illustrates one example of an FTIR system. For example, the detection lines may instead be generated by sweeping or scanning one or more beams of light inside the panel. Such and other examples of FTIR systems are e.g. disclosed in U.S. Pat. No. 6,972,753, U.S. Pat. No. 7,432,893, US2006/0114237, US2007/0075648, WO2009/048365, WO2010/006882, WO2010/006883, WO2010/006884, WO2010/006885, WO2010/006886, and WO2010/134865, which are all incorporated herein by this reference. The inventive concept may be applied to such alternative FTIR systems as well.

Irrespective of implementation, the light sensors 3 collectively provide an output signal, which is received and sampled by the signal processor 10. The output signal contains a number of sub-signals, also denoted "projection signals", each representing the energy of light emitted by a certain light emitter 2 and received by a certain light sensor 3, i.e. the received energy (or equivalently, power or intensity) on a certain detection line. Depending on implementation, the signal processor 10 may need to process the output signal for separation of the individual projection signals.

2. Reconstruction Functions and Input Format

As noted above, a reconstruction function or algorithm may be used for determining an interaction pattern across the touch surface 1, based on the projection signals in the output signal. Embodiments of the invention may use any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the reconstruction function may generate the interaction pattern by adapting one or more basis functions to the formatted signal values and/or by statistical methods such as Bayesian inversion. Examples of such reconstruction functions designed for use in touch determination are found in WO2010/006883, WO2009/077962, WO2011/049511, WO2011/139213, and WO2012/050510, all of which are incorporated herein by reference. Conventional reconstruction methods are found in the mathematical literature, e.g. "The Mathematics of Computerized Tomography" by Natterer, and "Principles of Computerized Tomographic Imaging" by Kak and Slaney.

The interaction pattern may be reconstructed within one or more subareas of the touch surface. The subareas may be identified by analyzing intersections of detection lines across the touch surface, based on the above-mentioned projection signals. Such a technique for identifying subareas is further disclosed in WO2011/049513, which is incorporated herein by this reference.

The reconstruction function is designed based on the assumption that the input values, s, depend on the interaction pattern, a, according to a projection function P, which reflects the properties of the physical touch system: $s = P(a)$. The reconstruction algorithm is thus designed to reconstruct a from s by use of a reconstruction function: $a = P'(s)$.

It is to be understood that the format of the input values s may be specific to the reconstruction function P'. The following examples assume that the reconstruction function P' is designed to reconstruct an attenuation field, i.e. each interaction value ("attenuation value") in the reconstructed interaction pattern a represents a local attenuation of energy by an attenuating medium. In such an implementation, the input values s may be represented as attenuation values for individual detection lines.

This choice of input values will now be further explained with reference to FIG. 2A, which indicates that the propagating light will not be blocked by the touching object 7. Thus, if two objects 7 happen to be placed after each other along a light path from an emitter 2 to a sensor 3, both objects 7 will interact with the propagating light. Provided that the light energy is sufficient, a remainder of the light will reach the sensor 3 and generate a projection signal that allows both interactions (touches) to be identified. Thus, in multi-touch FTIR systems, the transmitted light may carry information about a plurality of touches.

The transmission $T_k$ for the k:th detection line $D_k$ may be obtained from the definition of attenuation through an attenuating medium:

$$I_k = I_{0,k} \cdot (e^{-\int a(x)dx}) \rightarrow T_k = I_k/I_{0,k} = e^{-\int a(x)dx}$$

In this formulation, $I_k$ is a signal value (projection value) representing the transmitted energy on detection line $D_k$ with attenuating object(s), $I_{0,k}$ is a signal value representing the transmitted energy on detection line $D_k$ without attenuating objects, and $a(x)$ is the attenuation coefficient along the detection line $D_k$. In this formulation, the detection line is assumed to interact with the touch surface along the entire extent of the detection line, i.e. the detection line is represented as a mathematical line.

It is thus realized that a reconstruction function P' may be designed to operate on transmission data for the detection lines. Such transmission data may be obtained by dividing the projection values by a respective reference value ($REF_k$). By proper choice of reference values, the projection values are thereby converted into transmission values, which thus represent the fraction (normally in the range [0, 1]) of the available light energy that has been measured on each of the detection lines.

Certain tomographic reconstruction techniques, such as Filtered Back Projection (FBP) are based on the theory of the Radon transform which deals with line integrals. Such reconstruction techniques may therefore be designed to operate on formatted signal values $s_k$ given by the negative logarithm of the transmission:

$$s_k = -\log(I_k/REF_k) = -\log(e^{-\int a(x)dx}) = \int a(x)dx$$

It can be noted that the formatted signal values $s_k$ in fact is a measure of the total attenuation for the respective detection lines $D_k$.

In a variant, the formatted signal values $s_k$ may be given by any known approximation to the above expression. A simple approximation of $-\log(T_k)$, which is a good approximation when $T_k$ is close to 1 and may be useful also for smaller values of $T_k$, is given by $s_k = 1 - T_k$.

It should be emphasized that the format of the formatted signal values depends on (or is given by) the type of reconstruction function, although the format typically represents a decrease in signal energy caused by the interaction between touches and detection lines. In alternative implementations, the format may e.g. be given as a transmission (e.g. given by the projection value normalized by the reference value), an energy difference (e.g. given by the difference between the projection value and the reference value), or a logarithm of the energy difference. As used hereinabove, a "logarithm" is intended to also encompass functions approximating a true logarithmic function, in any base. Furthermore, the formatted signal values may have any sign, i.e. they may or may not be multiplied by a negative value. Depending on the reconstruction function, it may be possible to use the projection values as formatted signal values.

In the following description, "attenuation pattern" and "attenuation value" is used synonymously with "interaction pattern" and "interaction value", respectively. Reference may also be made to a "pixel" with a corresponding "pixel value" in an attenuation pattern. As used herein, a pixel is intended to encompass all types of cells, basis functions and areas defined in the attenuation pattern and associated with an attenuation value. The projection values and the formatted signal values obtained at a time point t are collectively denoted by $I_t$ and $s_t$, respectively.

3. Touch Attenuation Pattern and Reconstruction Artifacts

The result of operating the reconstruction function P' on the formatted signal values $s_t$ is an attenuation pattern $a_t$ that represents the distribution of accumulated attenuation on the touch surface 1. The "accumulated attenuation" includes both the attenuation caused by touching objects and the attenuation caused by contaminations on the touch surface, and such an interaction pattern $a_t$ may thus be denoted a "total attenuation pattern".

It is known in the art to at least partly compensate the total attenuation pattern $a_t$ for the influence of the contaminations on the touch surface, resulting in a "touch attenuation pattern" or "offset pattern", denoted $o_t$ herein. For example, WO2011/049512 proposes a touch system which repeatedly generates a current light status (corresponding to a total attenuation pattern). The touch system also repeatedly updates a background status (or "background pattern"), which is a two-dimensional distribution of estimated attenuation values caused by contaminations on the touch surface. A compensated light status (corresponding to a touch attenuation pattern) is then formed by subtracting the background status from the current light status. An alternative or supplementary compensation technique is proposed in WO2011/028169, in which the reference values ($REF_k$) used in converting the projection values into formatted signal values, are intermittently updated so as to include the influence of contaminations on the touch surface. By tracking the influence of contaminations via the updating of the reference values, the touch system compensates for the contaminations already in the input to the reconstruction function, which thereby directly generates a touch attenuation pattern. WO2011/049512 and WO2011/028169, as well as Applicant's PCT publication No. WO2013/048312, filed on Sep. 24, 2012, are all incorporated herein by reference in their entirety.

Figure 3A:
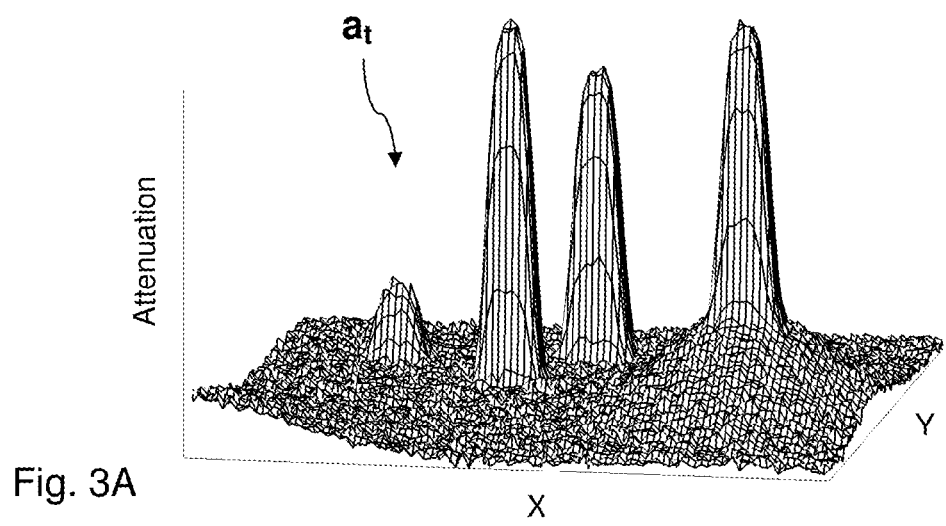
FIGS. 3A-3C are three-dimensional plots of a total attenuation pattern, a background pattern, and an offset pattern, respectively.
Figure 3B:
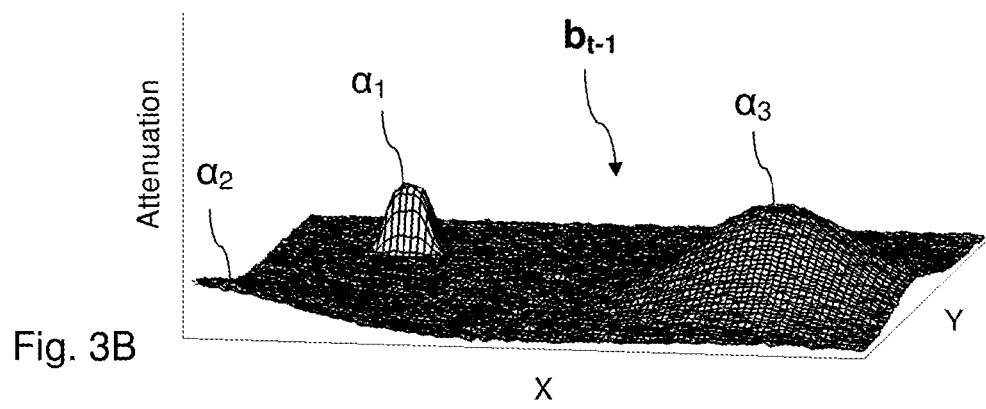
Figure 3C:
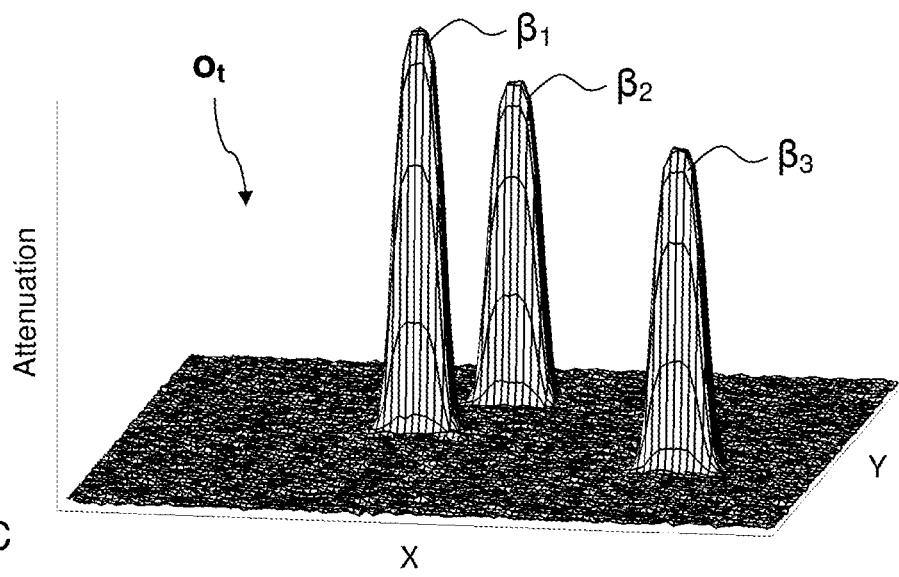

A total attenuation pattern $a_t$ is illustrated in FIG. 3A as a 3D plot in the coordinate system X,Y of the touch surface (cf. FIG. 2B). The pattern $a_t$ represents the accumulated attenuation on the touch surface, both from touches and contamination. FIG. 3B is a plot of an updated background pattern $b_{t-1}$ which exhibits a first attenuation component α1 caused by a fingerprint from an earlier touch, a second attenuation component α2 caused by smear from a palm resting on the touch surface, and a third attenuation component α3 caused by a liquid spill. FIG. 3C is a plot of the offset pattern $o_t$ obtained by subtracting the pattern $b_{t-1}$ from the pattern $a_t$, pixel by pixel. Three peaks β1, β2, β3 forming three touches are seen against a uniform background level close to zero attenuation.

The offset pattern $o_t$ in FIG. 3C is essentially free of noise and artifacts, and the touches are represented as strong attenuations, making the identification of touches an easy task. However, it is not uncommon that touches differ significantly in attenuation both within the offset pattern and as a function of time. For example, moving touches ("drags") are often seen to yield weaker attenuation than stationary touches in FTIR systems. For example, residual influence from contamination, as well as noise, may make it difficult to detect weaker touches in the offset pattern.

Figure 4A:
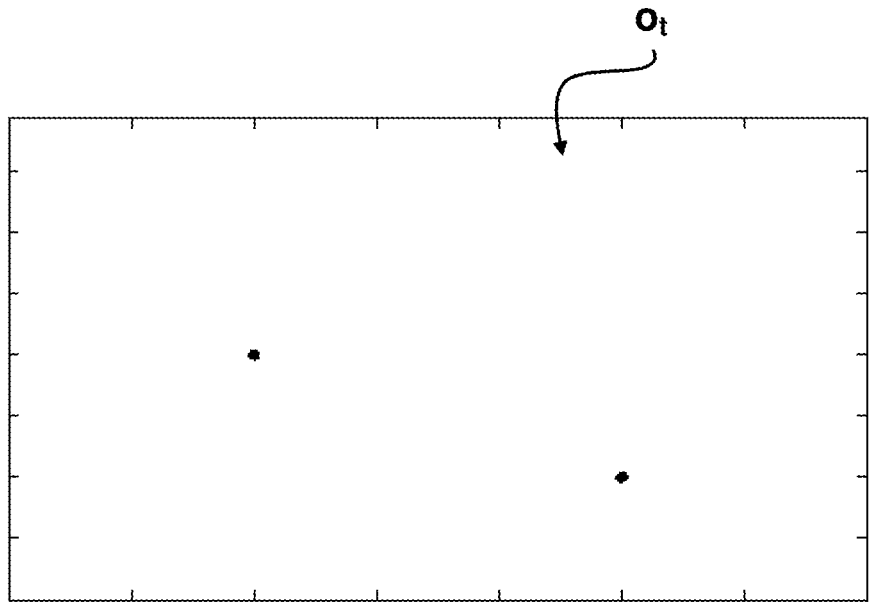
FIG. 4A is a top plan view of an offset pattern obtained by reconstruction processing.
Figure 4B:
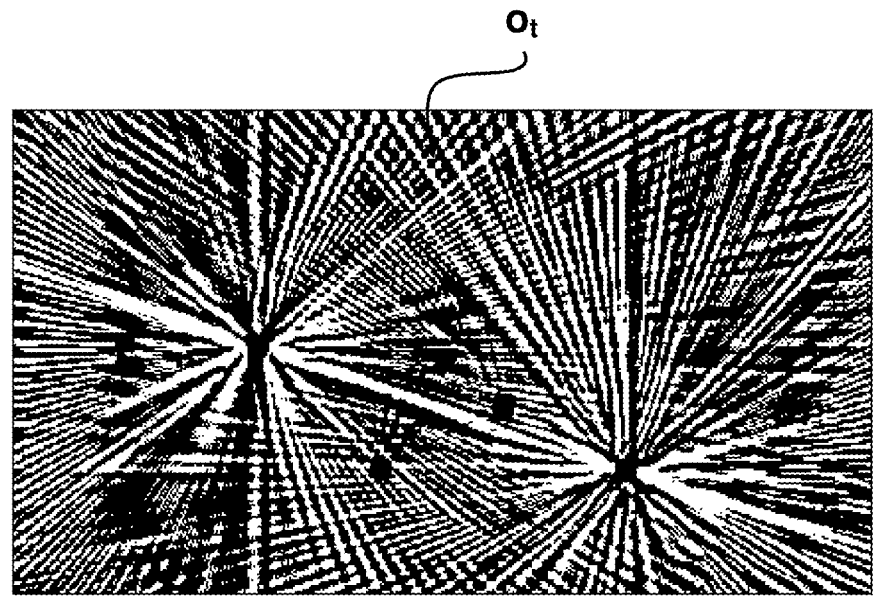
FIG. 4B illustrates the offset pattern in FIG. 4A after scaling to enhance weak signal features.

Furthermore, it has been found that weaker touches may be partially concealed by artifacts caused by the strongly interacting touches. FIG. 4A illustrates an offset pattern $o_t$ (dark areas indicate strong attenuation) which has been autoscaled between minimum and maximum attenuation values. The offset pattern seems to indicate two touches, although there are actually four objects on the touch surface. Two of the objects result in a significantly weaker attenuation (by a factor of 10) than the other two objects. In FIG. 4B, the offset pattern in FIG. 4A has been re-scaled to enhance weak features. Here, the two weakly interacting touches may be discerned in between the strongly interacting touches. It is seen that the interaction values of the weakly interacting touches are partially concealed by artifacts. In the example of FIG. 4B, the artifacts include star-like streaks emanating from the strongly interacting touches. These artifacts may originate from a local deformation of the touch surface caused by the touching objects, and/or they may result from an inability of the reconstruction function to accurately reproduce a true attenuation pattern.

To further explain the origin of artifacts, assume that the formatted signal values, s, depend on an attenuation field, $a_{true}$, on the touch surface according to a projection function P, which reflects the properties of the physical touch system:

$$s = P(a_{true}).$$

The reconstruction is aimed at reconstructing the attenuation field a (an approximation of the true interaction pattern $a_{true}$) from the formatted signal values s using a reconstruction function P':

$$a = P'(s).$$

Typically, the reconstruction function P' is not the exact inverse of the projection function P. One reason may be that certain properties of the physical touch system may be difficult and/or computationally expensive to include in P'. Another reason may be that P' may be based on mathematical principles that do not allow a perfect reconstruction. In either case, the reconstructed interaction pattern a will contain artifacts. Typically, strong touches will introduce stronger artifacts than weak ones, e.g. if P' is a linear function of s. If the touch system is exposed to touches that differ significantly in attenuation, even by one or several orders of magnitude, there is a significant risk that artifacts from a strongly interacting touch might conceal a weakly interacting touch.

4. Improved Detection of Weak and Strong Touches

Embodiments of the invention relate to touch determination techniques that are able to detect multiple touches on the touch surface, even if the touches have different degrees of interaction with the detection lines, e.g. even if one or more touches result in a significantly stronger attenuation of the propagating light in an FTIR system compared to one or more other touches. In various embodiments, this ability for improved touch determination is achieved by generating attenuation patterns that represent changes in attenuation across the touch surface on different time scales, whereupon a combination of information from these attenuation patterns are used in the touch determination. These embodiments rely on the insight that touches that are relatively weak in an offset pattern may be relatively stronger in an attenuation pattern that represents changes on a shorter time scale. For example, moving touches may be enhanced over stationary touches in an attenuation pattern if the time scale is reduced, since a stationary touch will exhibit little change in local attenuation on a shorter time scale while moving touches may result in significant changes in local attenuation (if the time scale is selected with due care to the expected velocity of the moving touches).

In the following examples, touches are detected using both the above-described offset pattern, $o_t$, which represents changes on a long time scale, and a differential interaction pattern ("difference pattern"), $da_t$, which represents more recent changes.

Figure 5:
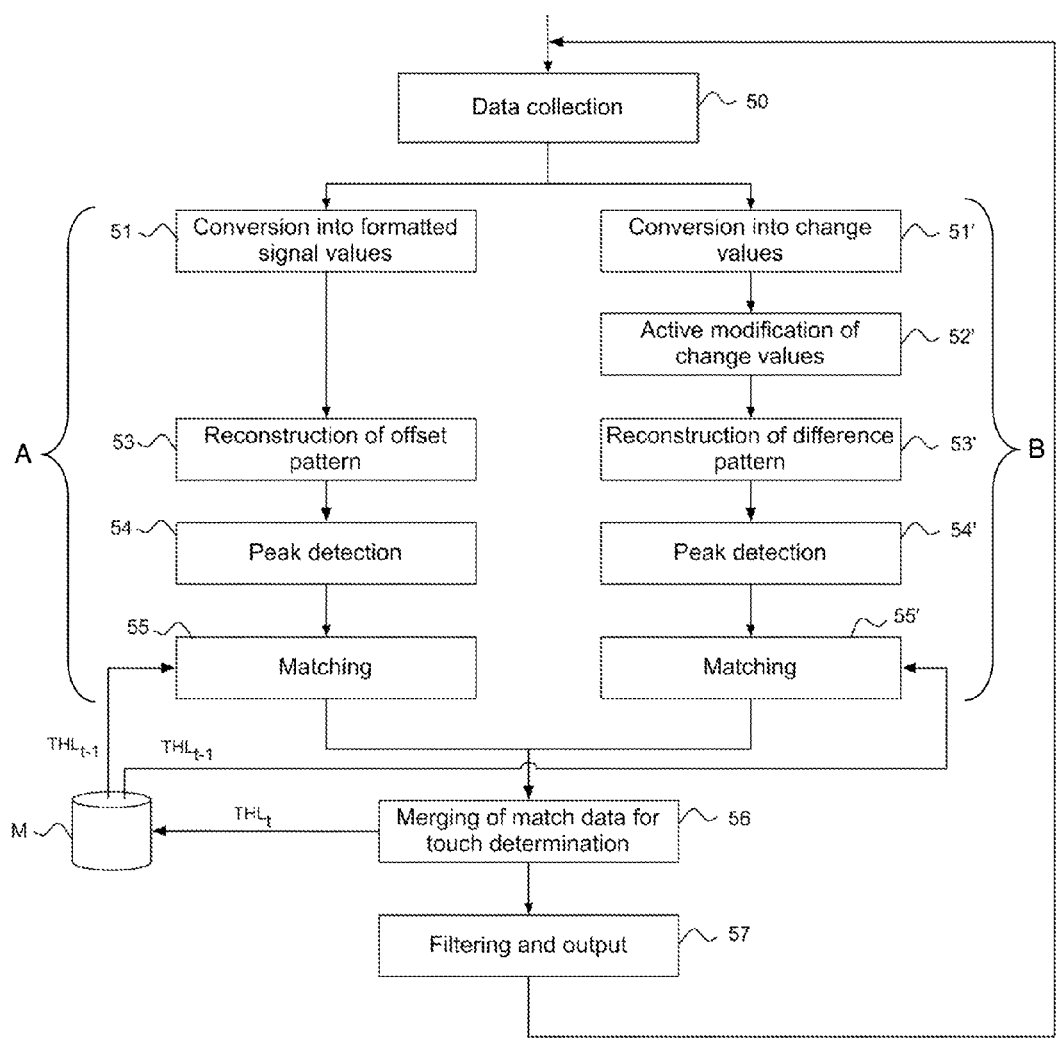
FIG. 5 is a flow chart of a method for enabling touch determination according to an embodiment of the invention.

FIG. 5 is a flow chart of a method for reconstruction and touch data extraction in a touch-sensitive apparatus, such as the above-described FTIR system. The method involves a sequence of steps 50-57 that are repeatedly executed, typically by the signal processor 10 (FIGS. 1-2). In the context of this description, each sequence of steps 50-57 is denoted a frame or an iteration.

Each frame starts by a data collection step 50, in which measurement values are obtained from the light sensors 3 in the FTIR system, typically by sampling a value from each of the aforesaid projection signals. The data collection step 50 results in one projection value for each detection line. It may be noted that the data may, but need not, be collected for all available detection lines in the FTIR system. The data collection step 50 may also include pre-processing of the measurement values, e.g. filtering for noise reduction.

After step 50, the process proceeds in two branches A and B which include steps 51-55 for generating and processing an offset pattern $o_t$ and steps 51'-55' for generating and processing a difference pattern $da_t$, respectively. The branches A, B may be executed in parallel, in sequence, or intermingled. Each of the branches A, B results in a collection ("match list") of matches between peaks in the offset and difference patterns and existing traces, as well as any peaks that do not match any existing traces and any existing traces that do not match any peaks. A record of the existing traces are kept in electronic memory M. This record is denoted a "trace history list" herein, although the record may be implemented by any suitable data structure, linear or non-linear, such as list, a hash table, a binary tree, etc. The trace history list is maintained to contain values of trace parameters for the traces deemed relevant to the current frame, e.g. all traces deemed to exist, which also may include any traces deemed not unlikely to exist. As indicated above, the trace parameters may e.g. include age, location, location history, interaction strength, size, and shape for each existing trace. In FIG. 5, the trace history lists updated in the latest frame and in the current frame are indicated by $THL_{t-1}$ and $THL_t$, respectively.

The resulting match lists are processed in a merging step 56 for determining a set of current touch data and for generating the updated trace history list. Thus, in the embodiment of FIG. 5, the offset and difference patterns are jointly processed for determination of the current touch data. Specifically, the merging step 56 is configured to enable improved detection of weak touches by incorporating information from the difference pattern $da_t$.

In step 57, at least part of the current touch data is output, and the process returns to the data collection step 50.

With reference to the embodiment of FIG. 5, and variants thereof, it is to be understood that one or more of the indicated steps may be effected concurrently. For example, the data collection step 50 of a subsequent sensing instance may be initiated concurrently with any one of the steps 51-55, 51'-55', 56 or 57.

Below, branches A and B as well as the concluding steps 56 and 57 will be exemplified in greater detail.

Branch A—Offset Pattern Processing

Branch A starts with a conversion step 51, in which the projection values $I_t$ are processed for conversion into the above-mentioned formatted signal values $s_t$. A subsequent reconstruction step 53 operates a reconstruction function P' on the formatted signal values $s_t$ to generate the offset pattern $o_t$, e.g. according to any of the techniques described above in Chapter 3. In a peak detection step 54, the offset pattern $o_t$ is then processed for detection of peaks, e.g. using any known technique. In one embodiment, a global or local threshold is first applied to the offset pattern, to suppress noise. Any areas with attenuation values that fall above the threshold may be further processed to find local maxima. The identified maxima may be further processed for determination of a touch shape and a center position, e.g. by fitting a two-dimensional second-order polynomial or a Gaussian bell shape to the attenuation values, or by finding the ellipse of inertia of the attenuation values. There are also numerous other techniques as is well known in the art, such as clustering algorithms, edge detection algorithms, standard blob detection, water shedding techniques, flood fill techniques, etc. The result of step 54 is collected in an offset peak list, which may include values of one or more of the following peak parameters: peak position, peak size, peak shape, peak attenuation, and peak noise estimate. The peak attenuation may e.g. be given by a maximum attenuation value or a weighted sum of attenuation values within the peak shape. The peak noise estimate represents the local variability of attenuation values within and/or around the peak and may e.g. be given as a signal-to-noise ratio (SNR), a variance or a standard deviation.

Figure 7:
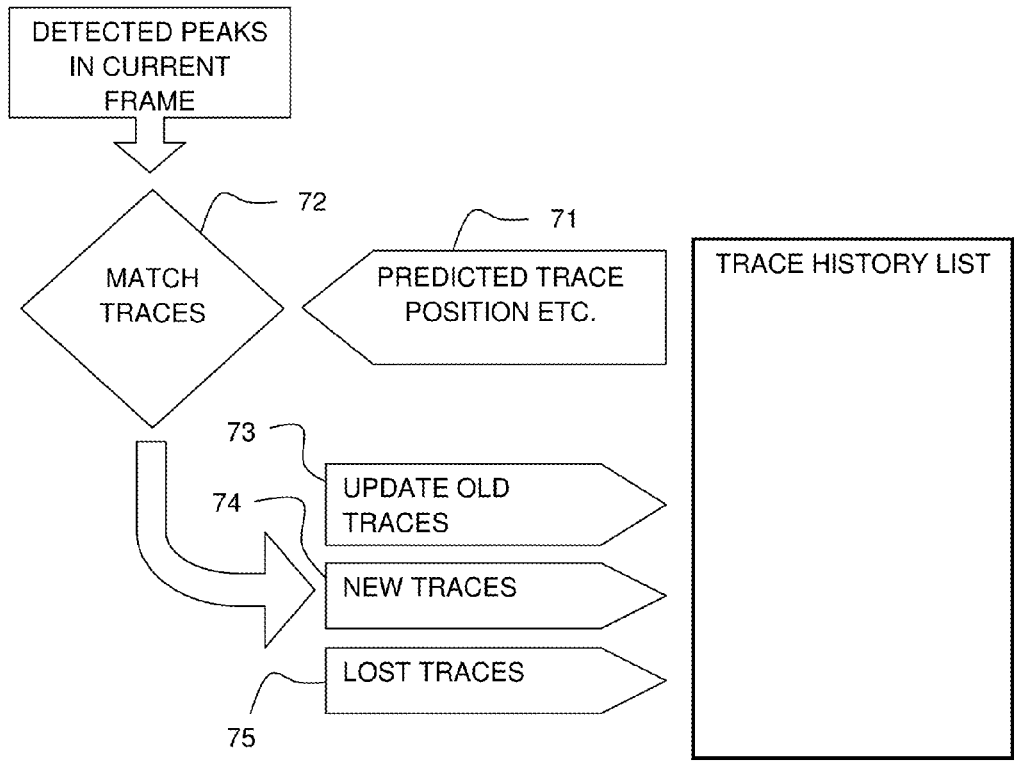
FIG. 7 illustrates a process of maintaining a trace history list which is used in the method of FIG. 5.

In a matching step 55, the detected offset peaks are matched to existing traces in the trace history list $THL_{t-1}$. Step 55 may be regarded as part of a process for maintaining the trace history list. The aim of such a maintaining process is to, based on detected matches between current offset peaks and traces in the trace history list $THL_{t-1}$, update the trace history list with current trace parameter values. FIG. 7 is an example of such a maintaining process, of which steps 71-72 belong to the matching step 55 and steps 73-75 belong to the merging step 56.

In step 71, the trace parameter values for the traces in the trace history list $THL_{t-1}$ are processed for generating predicted values for the current frame. Depending on implementation, step 71 may operate to predict the most likely location (coordinates), size and shape for all traces in the trace history list. Step 71 may be omitted, but is currently believed to improve the quality of the distance measures when computing match values (see below).

In step 72, the (predicted) values of the trace parameters are matched against corresponding parameter values for the offset peaks in the offset peak list. Thereby, a match value is computed between every offset peak and every trace in the trace history list. The match value indicates the likelihood of a match between the offset peak and a specific trace.

The match value may, e.g., be computed as a function of the Euclidian distance between the location of the offset peak and the (predicted) location of the trace, and/or as a function of a similarity in size and/or shape and/or attenuation strength. Also, invalid match values may be set for peak-trace combinations that are deemed impossible. One limitation for peak-trace combinations may be given by a maximum distance between the location of the offset peak and the (predicted) location of the trace. In one example, a match is deemed impossible if the distance is greater than 15 mm. Imposing restrictions on allowed peak-trace combinations also makes it possible to use smarter algorithms for the match value computations, for example a hierarchical search over the touch surface.

It is to be understood that the match values may be computed to factor in further trace parameters included in the trace history list, e.g. the age of the trace.

In step 72, the identified offset peaks are also assigned (i.e. matched) into the trace history list based on the match values, so as to determine one trace (if any) as a best match for each offset peak. A simple way to do this assignment, if the match values are calculated to represent a better match by a higher match value, is to start with the highest match value and proceed to gradually lower match values (a so-called greedy approach), and vice versa if a better match is represented by a lower match value. There are many other and more elaborate algorithms for making this assignment, such as Hungarian method (Kuhn's algorithm) or any other algorithm solving bipartite matching based on match values. In an alternative, the assignment accounts for the age of the trace associated with the respective match value, e.g. by starting with the oldest match value/trace (largest value of age parameter) and proceeding to gradually younger match values/traces.

Step 72 results in a match list, in which each offset peak is either assigned to a trace or is identified as lacking an assigned trace ("unmatched peak") Likewise, each trace is either assigned to an offset peak or is identified as lacking an association ("unmatched trace").

Step 73-75 in FIG. 7 will be described below in relation to step 56.

Branch B—Difference Pattern Processing

Branch B starts with a conversion step 51', in which the projection values $I_t$ are processed for generation of change values $ds_t$. The change values correspond to a difference in formatted signal values between the current frame (t) and a previous frame (t−n). Using the above definition of the formatted signal values, it can be shown that:

$$ds_t = s_t - s_{t-n} = \log\left(\frac{I_{t-n}}{REF}\right) - \log\left(\frac{I_t}{REF}\right) = -\log\left(\frac{I_t}{REF} / \frac{I_{t-n}}{REF}\right) = -\log(I_t / I_{t-n})$$

Thus, the change values $ds_t$ represent the relative change in projection values between the previous and the current frame. Thereby, it is realized that the change values may be calculated as a difference in logarithmic signal values:

$$ds_t = -\log(I_t/I_{t-n}) = \log(I_{t-n}) - \log(I_t)$$

In step 51', the change values $ds_t$ may be calculated by retrieving comparison values that were generated in step 50 during the previous frame and stored in electronic memory M. The comparison values may e.g. be given as projection values $I_{t-n}$, logarithmic projection values $\log(I_{t-n})$, or formatted signal values $s_{t-n}$.

Then follows an optional modification step 52' that modifies the change values $ds_t$ to further suppress the influence of strong attenuations compared to weak attenuations. This may be seen as a process of changing the dynamics of the ensemble of change values, i.e. the relation between the change values for different detection lines. Thus, the modification step 52' actively modifies the relative distribution of change values among the detection lines. As will be explained in Chapter 5 with reference to detailed examples, this may be achieved in different ways, e.g. by applying a re-scaling function to the change values, or by identifying strongly interacting touches in a reference pattern and actively modifying the change values only for those detection lines that are deemed affected by these strongly interacting touches. It is to be understood that only a subset of the change values may need to be modified.

In a reconstruction step 53', a reconstruction function P' is operated on the (modified) change values $ds_t$ to generate the above-mentioned difference pattern $da_t$. Most reconstruction functions P' are at least approximately linear, i.e. $P'(a \cdot x + b \cdot y) = a \cdot P'(x) + b \cdot P'(y)$, and the difference pattern may thus be generated by operating the reconstruction function P' on the change values:

$$da_t = a_t - a_{t-n} = P'(s_t) - P'(s_{t-n}) = P'(s_t - s_{t-n}) = P'(ds_t)$$

where $a_t$ and $a_{t-n}$ is the total attenuation pattern at the current and previous frame, respectively. The difference pattern $da_t$ is a distribution of difference values across the touch surface (or a relevant part of the touch surface), where each difference value may represent a local change (increase/decrease) in attenuation between the current and the previous frame in a specific position or reconstruction cell (pixel) on the touch surface. The difference pattern $da_t$ may thus be seen as an image of the change in touch interaction and in contamination contribution between these frames across the touch surface 1.

Step 53' may, but need not, include a compensation for contaminations. If the time scale is sufficiently short, the addition of contaminations between the previous frame and the current frame may be neglected. Further, step 53' may use any suitable projection function P', which may but need not be the same as used in step 53.

The difference pattern $da_t$ may alternatively be calculated by subtracting the current total interaction pattern with a previous one: $da_t = a_t - a_{t-n}$. However, by operating on change values, the need to calculate, store and retrieve the total interaction pattern across iterations of the method is obviated.

Figure 6A:
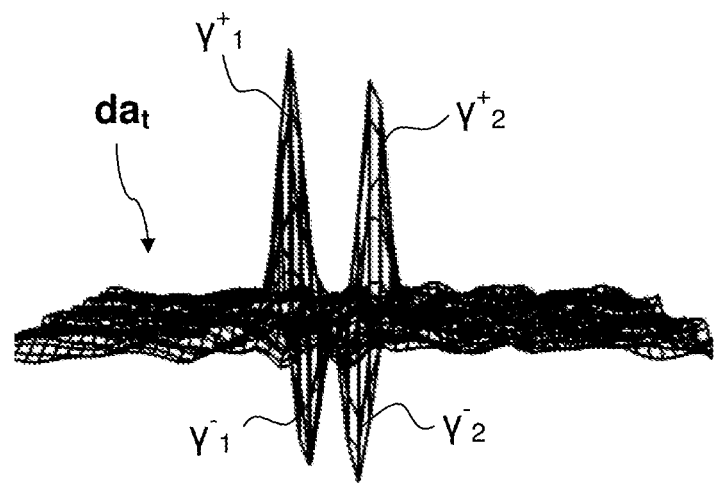
FIGS. 6A-6B are plots of a difference pattern representing two moving objects.
Figure 6B:
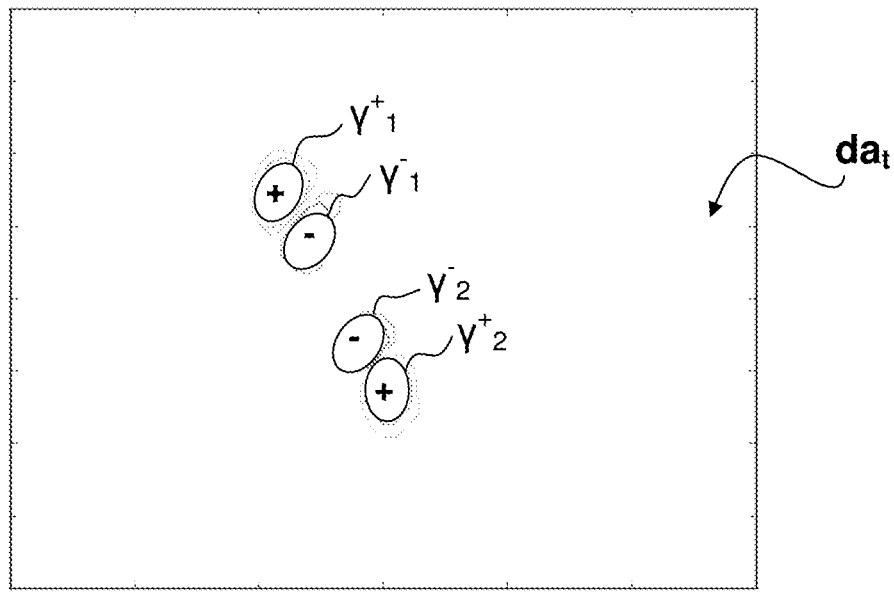

As indicated above, the use of a difference pattern $da_t$ makes it possible to detect small changes in attenuation which may be difficult to detect in a total interaction pattern $a_t$ or an offset pattern $o_t$ due to reconstruction artifacts. The difference pattern mainly indicates the temporal change in attenuation caused by moving objects in contact with the touch surface. The resulting touches generally appear as "dipole peaks" in the difference pattern, i.e. a combination of a positive peak and a negative peak. FIG. 6A is a 3D plot of a difference pattern $da_t$ containing two dipole peaks $\gamma_1^+, \gamma_1^-$ and $\gamma_2^+, \gamma_2^-$. FIG. 6B is plan view of the difference pattern $da_t$ in FIG. 6A. When an object is moved between the previous and the current frame, the corresponding touch occupies new pixels, resulting in a positive peak, and leaves old pixels, resulting in a negative peak. If an object is removed from the touch surface, the removed touch will be represented by a single negative peak in the difference pattern, and if an object is brought into contact with the touch surface, the new touch will be represented by a single positive peak. In FIG. 6B, it is realized that the objects have moved away from each other between the frames.

The time difference between the previous and the current frame may be selected to be small enough to avoid significant build up of contamination, while being long enough for the movement of touching objects to result in attenuation changes. It is currently believed that, at least in certain implementations, the time difference should be larger than 5 ms, preferably 20-80 ms but may be as large as 1-5 seconds. The upper limit may alternatively be given by an expected maximum velocity of the touching objects, to prevent that when two objects are moved, one of the objects is moved into the position of the other object within the time difference.

Following step 53', the difference pattern $da_t$ is processed in a peak detection step 54' for detection of peaks, e.g. using any known technique. Step 54' may be similar to step 54, and be configured to detect only positive peaks, only negative peaks, or both. In one embodiment, the detection is focused on the positive peaks, since these peaks are correlated with the current position of the moving object on the touch surface. In an alternative, each dipole peak is treated as a single peak, the position of which is calculated as a (weighted) average of the positions for the positive and negative peaks. The result of step 54' is collected in a difference peak list, which may include values of one or more of the following peak parameters: peak position, peak size, peak shape, peak attenuation, peak noise estimate, and sign. The sign indicates if the peak is positive or negative. It is to be understood that the sign parameter is not needed if the peak difference list only includes either negative or positive peaks.

The subsequent matching step 55' may be implemented similarly to the matching step 55, e.g. as described above in relation to FIG. 7. However, the computation of match values may differ between step 55' and step 55. Step 55' results in a match list, in which each difference peak is either assigned to a trace or is identified as lacking an assigned trace ("unmatched peak"). Likewise, each trace is either assigned to a difference peak or is identified as lacking an association ("unmatched trace").

Merging Information from Branches A and B (Step 56)

Step 56 has the dual purpose of determining current touch data and of generating an updated trace history list $THL_t$ to be stored in memory M for use in steps 55 and 55' of the forthcoming frame.

The current touch data is determined by combined analysis of the match lists generated by steps 55 and 55' in the current frame.

If a trace is only matched to an offset peak (and not to a difference peak), the current touch position is determined as a function of the location of the offset peak, i.e. based on information from the offset pattern and not the difference pattern. The current touch position may e.g. be set to the current location of the offset peak, but may alternatively be calculated as a function of other parameter values in the trace history list, such as the location history of the trace.

If a trace is only matched to a difference peak (and not to an offset peak), the current touch position is determined as a function of the location of the difference peak, i.e. based on information from the difference pattern and not the offset pattern. The current touch position may e.g. be set to the current location of the difference peak, but may alternatively be calculated as a function of other parameter values in the trace history list, such as the location history of the trace.

If a trace is matched to both an offset peak and a difference peak, the current touch position is calculated as a function of the locations of both peaks, i.e. based on information from both the difference pattern and the offset pattern. This may be done in many different ways. In one embodiment, different combination heuristics are applied depending on an estimated velocity of the trace. The estimated velocity may be included as a trace parameter or be calculated based on the location history. The estimated velocity may alternatively be calculated based on the distance between the positive and negative difference peaks belonging to the trace in a preceding frame.

The combination heuristics may, e.g., stipulate that, if the trace velocity is above a certain threshold, the current touch position is calculated as a function of the location of the difference peak (and not the offset peak), and otherwise as a function of the location of the offset peak (and not the difference peak). Thereby, the position of a relatively fast moving object is given by the difference pattern, whereas a slower moving object is given by the offset pattern. In a variant, further thresholds are used to identify plural velocity intervals, and the current touch position is calculated differently in the different velocity intervals. For example, the current touch position may be given as a function of a weighted average of the locations of the offset and difference peaks for moderately moving objects.

In another embodiment, the combination heuristic to be applied is given by the mutual distance between the (positive or negative) difference peak and the offset peak in the current frame and/or in a preceding frame. If the distance is above a specific threshold, the current touch position may be calculated as a function of the location of the difference peak, and otherwise as a function of the location of the offset peak (or an average of the locations of the difference and offset peaks). It is of course possible to use further thresholds to identify plural distance intervals, and to calculate the current touch position differently in the different distance intervals.

It is also possible to use both trace velocity and mutual distance for determining the combination heuristic to be applied. In one such example, the current touch position is given only by the difference peak if both the estimated velocity and the mutual distance are sufficiently large, and otherwise by the offset peak. Such an implementation may, e.g., serve to stabilize the determined touch position when the touching object is comparatively large and causes positive and negative difference peaks at its edges even when it is not moved on the touch surface, e.g. due to instabilities in its posture.

Unmatched peaks in the match lists may be considered as the starting point of a new trace. The current touch position of new trace may be set to the location of the unmatched peak. In a special implementation, new traces may only be identified based on unmatched peaks in the difference pattern. This may improve the touch detection, if the offset pattern is more susceptible to reconstruction artifacts.

Traces that are unmatched in both match lists do not result in any current touch data.

It is realized that other data for each touch, such as the shape, size, attenuation strength, etc, may be determined by combining information from the match lists in a similar way. In fact, the current touch data may but need not include the touch location.

Step 56 also involves updating the trace history list based on the match lists. The updating process is illustrated in FIG. 7. In step 73, the trace history list is updated for all matched traces, by updating the corresponding trace parameters as a function of the peak parameter values for the peak or peaks that are associated with a specific matched trace. Typically, the updating makes use of the current touch data, although it is conceivable that the peak parameter values are combined differently for use in the updating process compared to when calculating the current touch data. In step 74, unmatched peaks are interpreted as new traces and are added to the trace history list. Like in step 73, the trace parameter values may be given by the current touch data or calculated as a function of the peak parameter values. In step 75, traces that are unmatched in both match lists are interpreted as lost traces and are removed from the trace history list. In one variant, the removal of such a trace is delayed for a few (e.g. 1-10) frames to make it possible to find peaks belonging to the trace in a later frame. This may e.g. avoid removal of weak traces that may be temporarily hidden in noise or artifacts. In another variant, these unmatched traces are removed if one or more trace parameter values fulfil a given criterion, e.g. if the local noise has decreased below what is expected, or if the interaction strength of a trace has decreased rapidly over a sequence of preceding frames (which may indicate that the corresponding object is being lifted from the touch surface).

In a variant, step 56 operates to determine the current touch data by combined analysis of the match lists generated by steps 55 and 55' in different frames. In one embodiment, step 56 processes the match list generated by step 55' in the current frame (i.e. at time point t, by matching detected difference peaks to the trace history list $THL_{t-1}$) and the match list generated by step 55 in a preceding frame (e.g. at time point t−1). This means that only branch B needs to be completed in the current frame when step 56 is to be executed. This embodiment may reduce latency, i.e. the time delay until a change on the touch surface is seen in the current touch data. It is understood that branch A is also completed for the current frame, to generate a match list (in step 55, by matching detected offset peaks to the trace history list $THL_{t-1}$ or to the updated trace history list $THL_t$) which is stored in memory M for retrieval by step 56 in a forthcoming frame, e.g. the next frame. The approach of basing step 56 on a current match list from branch B and an older match list from branch A ensures that changes in the difference pattern $da_t$ are quickly detected for inclusion in the current touch data. This promotes smaller latency for fast changes in touch interaction, as manifested in the difference pattern $da_t$, and an acceptably larger latency for changes on a longer time scale, as manifested in the offset pattern $o_{t-1}$. The above-described techniques for combining data from the match lists and for updating the trace history list are equally applicable to this variant.

Filtering and Output (Step 57)

Step 57 may output all of the current touch data determined in step 56. It is conceivable that step 57 implements an "output filter", which manipulates the current touch data to improve the user experience. For example, the output filter may postpone output of current touch data for new traces for a number of frames to suppress the influence of erroneous peak detections. Likewise, the output filter may be configured to delay removal of an unmatched trace for a number of frames, e.g. by outputting the latest touch data for the unmatched trace during these frames or by outputting touch data that is projected for these frames based on the trace parameter values in touch history list. It is also conceivable that the output filter is configured to make an active selection among the traces found in step 56 and only output the current touch data for the selected traces.

Figure 8:
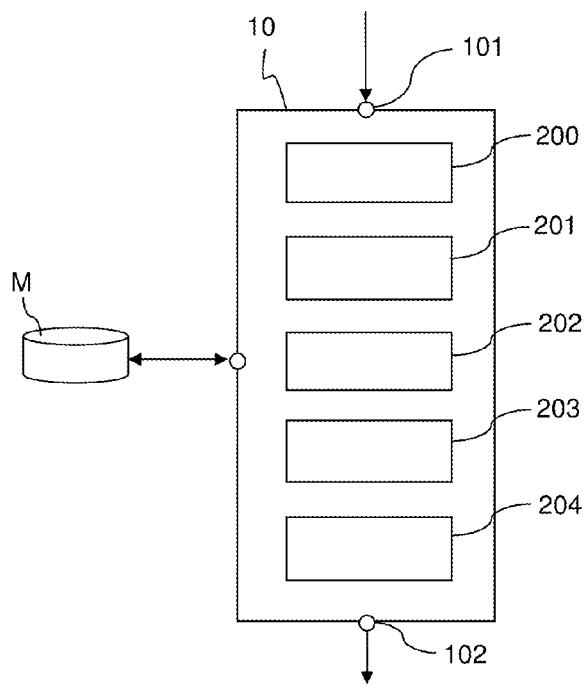
FIG. 8 is a block diagram of a structure for implementing the method of FIG. 5.

The method of FIG. 5 may be implemented by a data processing device (cf. signal processor 10 in FIGS. 1-2) which is connected to sample the measurement values from the light sensors 3 in the FTIR system. FIG. 8 shows an example of such a data processing device 10, which includes an input 101 for receiving the output signal. The device 10 further includes a data collection element (or means) 200 for obtaining the current projection values, an offset pattern processing element (or means) 201 that implements branch A, a difference pattern processing element (or means) 202 that implements branch B, a merging element (or means) 203 for determining current touch data by combined analysis of match lists generated by the offset pattern processing element 201 and the difference pattern processing element 202, an outputting element (or means) 204 for providing the current touch data for output, and an output 102 for outputting the current touch data.

The device 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit (cf. 14 in FIG. 2A) may serve as one element/means when executing one instruction, but serve as another element/means when executing another instruction. In addition, one element/means may be implemented by one instruction in some cases, but by a plurality of instructions in some other cases. Naturally, it is conceivable that one or more elements (means) are implemented entirely by analog hardware components.

The software controlled device 10 may include one or more processing units (cf. 14 in FIG. 2A), e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc, as well as one or more data acquisition devices, such as an A/D converter. The special-purpose software may be provided to the device 10 on any suitable computer-readable medium, including a record medium, and a read-only memory.

5. Modification of Difference Pattern for Suppressing Strong Touches (Step 52')

As explained above, the reconstruction function is adapted to operate on formatted signal values. The formatted signal values are thus generated according to a predetermined formatting function or algorithm, which is defined with respect to the reconstruction function. The formatted signal values may, but need not, be correct (at least in an approximation) in view of the physical model that underlies the reconstruction function. The formatted signal values fit to the reconstruction function to such an extent that the reconstruction function, if operated on the formatted signal values, yields an attenuation pattern which is a better representation of the "true" attenuation pattern than the attenuation pattern obtained by operating the reconstruction function on otherwise formatted signal values. Therefore, in the context of the following disclosure, the former attenuation pattern is denoted "actual difference pattern" and the latter attenuation pattern is denoted "modified difference pattern" or "distorted difference pattern". However, it should be understood that the actual difference pattern may deviate, even significantly, from the true difference pattern, e.g. as a result of measurement or processing noise, inaccuracy or non-linearity in signal detection, intentional or unintentional simplifications in the physical model and/or reconstruction function, etc.

It is important to notice that the modified difference pattern need not be generated by modifying the change values in step 52' as indicated in FIG. 5. In a variant, the modification is implemented in step 51', as part of the generation of the change values.

The modification is achieved by active modification of one or more change values so as to suppress the influence of strong attenuations in relation to weak attenuations in the resulting difference pattern. In the following, two main approaches to generating modified change values will be exemplified in greater detail.

5.1. Use of a Re-Scaling Function

One main approach to enhance weakly interacting touches over strongly interacting touches in the difference pattern is to apply a re-scaling function, $\tilde{f}$, that reduces the dynamics between strong and weak touches in the change values that are fed to the reconstruction function:

$$da_t^x = P'(\tilde{f}(ds_t)).$$

Here $\tilde{f}$ is a function which applies the re-scaling function $f$ element-wise to the change values in $ds_t$, to generate the modified change values. The re-scaling function $f$ will typically be a non-linear monotonically increasing function with a decreasing rate of increase, i.e. the derivative of the function decreases with increasing change value.

Figure 9A:
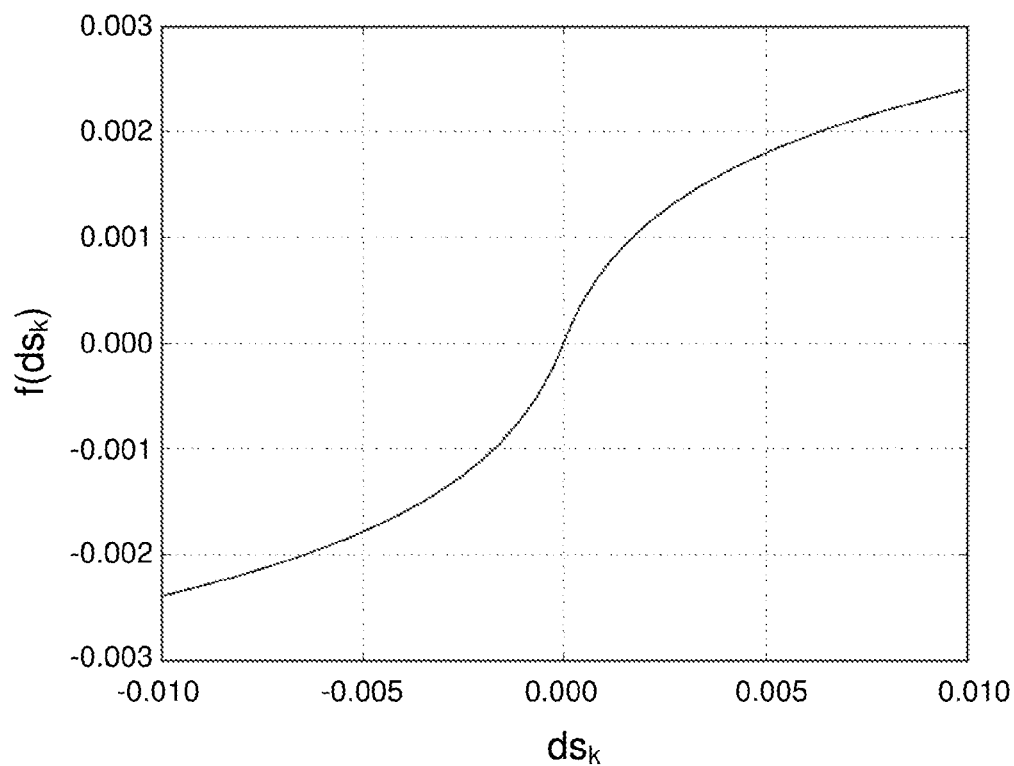
FIGS. 9A-9C are graphs of different re-scaling functions for use upstream of a reconstruction function for reconstructing a difference pattern in the method of FIG. 5.
Figure 9B:
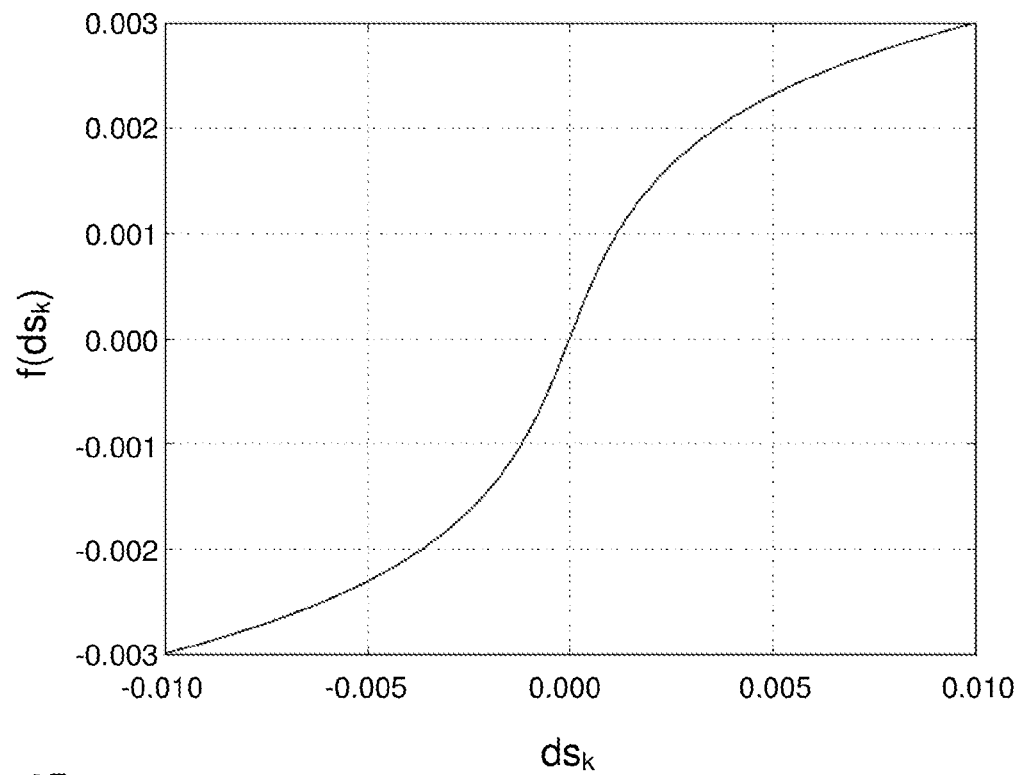
Figure 9C:
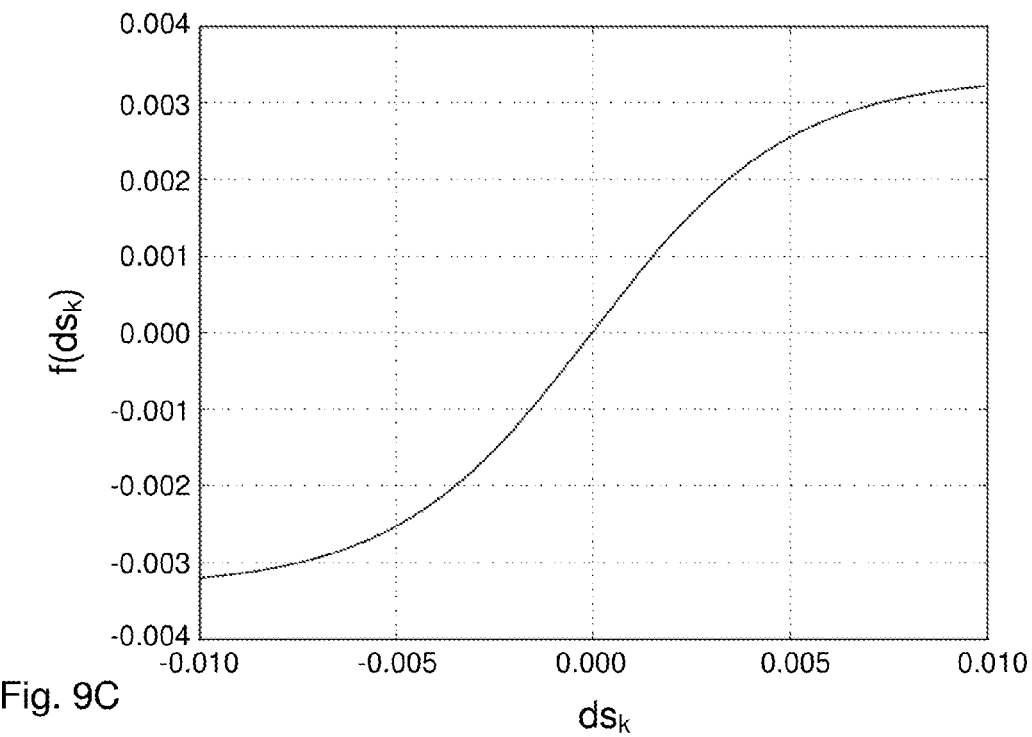

FIGS. 9A-9C illustrate three examples of suitable re-scaling functions $f$. FIG. 9A is a graph of a logarithm-based function, $f_l(ds_k)=\delta \cdot \text{sign}(ds_k) \cdot \log(1+\eta \cdot |ds_k|)$, FIG. 9B is a graph of a re-scaling function based on the inverse hyperbolic sine function, $f_a(ds_k)=\delta \cdot a\sinh(\eta \cdot ds_k)$, and FIG. 9C is a graph of a re-scaling function based on a sigmoid function (the logistic function), $$f_s(ds_k) = \delta \cdot \text{sign}(ds_k) \cdot \left(\frac{2}{1+e^{-\eta |ds_k|}} - 1\right).$$

All of these re-scaling functions are approximately linear close to $ds_k=0$, and the parameter $\eta$ controls how soon (when $ds_k$ increases from 0) the re-scaling function becomes significantly non-linear with the effect of scaling down large values of $ds_k$. In the graphs of FIGS. 9A-9C, the control parameter $\eta$ was set to 1000, 1000 and 400, respectively. The parameter $\delta$ may be used to scale the function linearly, for example so that the maximum change value is 1, if this is required by the reconstruction function. In another embodiment the parameter $\delta$ may be chosen to let the derivative of the rescaling function be 1 when $ds_k=0$. It should be noted that all of these re-scaling functions may handle negative signal values, since $ds_k$ generally is negative for detection lines where touches have been removed (where they are present in $I_{t-n}$ but not in $I_t$). Another approach, for all re-scaling functions, would be to set $f(ds_k)=0$ when $ds_k<0$, e.g. when only positive difference peaks are of interest for the touch data determination in step 56.

The above re-scaling functions are only given as examples, and the skilled person immediately realizes that many other viable choices for $f$ exist. A fast implementation of the rescaling may use a piece-wise linear interpolation approximating the shape of the above-mentioned functions.

It should be noted that the subsequent reconstruction (step 53' in FIG. 5) no longer aims at reconstructing a close approximation of the true difference pattern. Instead, the ratio between strongly and weakly interacting touches in the modified difference pattern is caused to deviate, possibly significantly, from the true ratio. This is acceptable if the main task is to enable all relevant peaks to be detected and their locations to be estimated with sufficient accuracy. If the absolute interaction strength of the peaks also needs to be accurately estimated, this may be obtained in several ways. One way would be to, after the identification of peaks in the modified difference pattern (in step 54'), locally reconstruct the actual difference pattern, by computing $P'(ds_t)$, at the required locations (e.g. locally around an identified peak). If the function P' produces significant artifacts from stronger touches, a more accurate (with less artifacts) but more time-consuming reconstruction function P'' may be applied to locally reconstruct the actual difference pattern at the required locations. Another way would be to use the iterative compensation approach, described below, to suppress the contribution from all other touches in the change values $ds_t$ before doing the reconstruction. Yet another way would be to apply a compensating function, $f'$, to the modified difference pattern $da_t^\tau$, to counteract the effect of the re-scaling function $f$, i.e.:

$$da_t' = f'(P'(f(ds_t))).$$

It should be noted however, that in general the application of a non-linear re-scaling function $f$ results in a distortion of the reconstruction $P'(f(ds_t))$ which cannot be fully compensated by $f'$.

As noted in connection with the exemplifying re-scaling functions in FIGS. 9A-9C, the re-scaling function $f$ may have a parameter $\eta$ that controls which signal values are mapped approximately linearly and which are mapped non-linearly (scaled down). Such a control parameter $\eta$ may be set depending on the range of signal levels produced by strong and heavy touches, and/or the noise level. Typically, it may be a good idea to have the signal levels from the weakest touches in the (approximately) linearly mapped range, and stronger touches in the (significantly) non-linearly mapped range.

5.2 Use of Iterative Compensation

Another main approach to enhance weakly interacting touches over strongly interacting touches in the difference pattern is to obtain a reference pattern on the touch surface and to identify the locations of all strongly interacting touches in the reference pattern. Then, the detection lines intersecting these locations are identified, and the change values for these detection lines are modified to reduce the contribution from the strongly interacting touches.

The reference pattern should thus allow the locations of the strongly interacting touches to be determined. In the following examples, the reference pattern is obtained by operating the reconstruction function on the change values $ds_t$:

$$da_t = P'(ds_t).$$

Thus, in step 52', the actual interaction pattern $da_t$ is obtained for use as a reference pattern. Then, modified change values $ds_t^\tau$ are determined by suppressing or even removing, in the change values $ds_t$, the contribution from the strong touches that were identified in the actual difference pattern $da_t$. In this context "strong touches" may be formed by all touches that are identifiable in the actual difference pattern $da_t$, or by all touches with an interaction strength (maximum attenuation value, average attenuation value, etc) that exceeds a given threshold. Thereafter, in step 53', the reconstruction function is operated on the modified change values to generate a modified difference pattern, $da_t^\tau = P'(ds_t^\tau)$, in which weakly interacting touches are enhanced over strongly interacting touches.

In one embodiment, the modified difference values $ds_t^\tau$ are generated by decreasing the change values for the affected detection lines by an estimated contribution of the strong touches to the respective change value.

In an alternative embodiment, which requires less processing and which may be more robust, the modified change values $ds_t^\tau$ are generated by setting the change values of the affected detection lines to a value that indicates a reduced interaction, e.g. by reducing these change values by a predetermined amount or percentage (fraction) or setting them to a predefined value. In one embodiment, the predefined value is selected such that the strong touches are essentially eliminated ("annihilated") in the subsequently modified difference pattern $da_t^\tau$. For example, the predefined value may be set to indicate that the affected detection lines are unaffected by touches altogether. For example, the predefined value may be zero (0).

By using such a predefined criterion, information about the weak touches is also eliminated from the change values $ds_t$, but in general enough information from the weaker touches remains in the modified change values $ds_t^\tau$ to make the weaker touches detectable in the modified difference pattern $da_t^e$ and allow adequate identification of difference peaks.

It is to be understood that the iterative compensation approach may be used with any reconstruction function $P'$, and that it would be possible to configure the processing structure to perform further iterations within step 52', i.e. to generate further modified change values by removing the contribution from touches/peaks detected in a first modified difference pattern, and to operate the reconstruction function on the further modified change values to generate a further modified difference pattern, etc.

It is conceivable that the actual difference pattern $da_t$ is pre-processed before being used as the reference pattern for identifying the detection lines that are affected by strong touches, for example for feature enhancement, noise reduction etc. In an alternative, the reference pattern is obtained from an actual difference pattern or an offset pattern determined in a preceding frame.

The strong touches may be identified by any known feature extraction technique, e.g. as discussed in relation to steps 54 and 54' in FIG. 5. Once the strong touches are identified, different techniques may be utilized to determine the detection lines that are affected by the strong touches.

In one embodiment, step 52' accesses a data structure that links regions on the touch surface to the detection lines that intersect the regions. For example, if the difference pattern defines attenuation values in a grid of pixels on the touch surface, the data structure may associate each pixel, which has a certain position in the coordinate system of the touch surface, to a set of intersecting detection lines. Thereby, step 52' may map the pixels included in each strong touch to the data structure to identify the affected detection lines.

Figure 10:
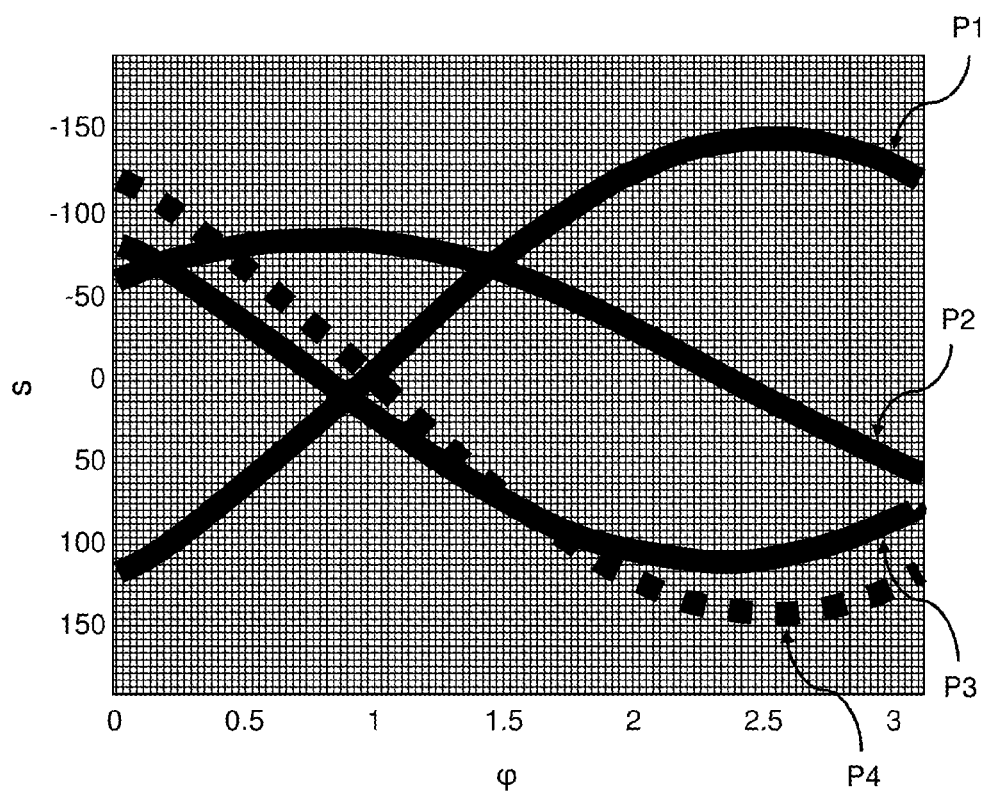
FIG. 10 is a sinogram obtained by mapping change values for available detection lines to a two-dimensional sample space.

In another embodiment, each detection line is defined by first and second dimension values in a two-dimensional sample space, such that the first and second dimension values define the location of the detection line on the touch surface. For example, in the realm of Filtered Back Projection (FBP), it is not uncommon to define detection lines in terms of a rotation angle $\phi$ of the detection line with respect to a reference direction, and a distance $s$ of the detection line from a predetermined origin. It is also well-known that the attenuation values may be mapped to a two-dimensional sample space, a $(\phi, s)$ plane, so as to form a so-called sinogram. An example of such a sinogram is shown in FIG. 10, in which each square represents a change value of a detection line. Each location on the touch surface corresponds to a predetermined sinus curve in the $(\phi, s)$ plane. FIG. 10 illustrates three such curves P1-P3 that correspond to three strong touches identified in a reference pattern. In fact, each illustrated curve P1-P3 is composed of several curves for each pixel covered by the respective strong touch in the reference pattern. Furthermore, each such curve is given a certain width in the $s$ direction, so as to form a band in the $(\phi, s)$ plane. The width may be set in dependence of the size of the pixels in the reference pattern. It is realized that the affected detection lines may be identified by simply mapping the location of each strong touch in the reference pattern to its corresponding curve P1-P3 in the $(\phi, s)$ plane, and by intersecting each curve P1-P3 with the detection lines as mapped to the $(\phi, s)$ plane. If the change values are mapped to form a sinogram in the $(\phi, s)$ plane, as shown in FIG. 10, the predetermined criterion may be applied at the same time as the mapping, e.g. by setting all change values intersected by the curves P1-P3 to a predetermined value, e.g. zero. For comparison, FIG. 10 also includes a curve P4 (dotted line) that corresponds to a weak touch, which is not detectable in reference pattern. It is realized that even if the change values of all affected detection lines are set to zero, a significant amount of change values remains along curve P4 enabling the reconstruction function to generate a modified difference pattern in which the weak touch is detectable.

It should be realized that there are other parameter representations of the detection lines that may be used to define the sample space. For example, the detection lines can be represented in a ($\beta$, $\alpha$) plane, as is used in a fan geometry which is a standard geometry widely used in conventional tomography e.g. in the medical field. In such standard geometries, the detection lines may be defined in terms of an angular location $\beta$ of the incoupling or outcoupling point of the detection line with respect to a reference direction, and a rotation angle $\alpha$ of the detection line. Alternatively, the incoupling points and the outcoupling points may be given by respective unique indexes, whereby a first dimension of the sample space is given by an index of the incoupling points, and the second dimension of the sample space is given by an index of the outcoupling points.

6. Concluding Remarks

While the invention has been described in connection with what is presently considered to be the most practical and preferred embodiments, it is to be understood that the invention is not limited to the disclosed embodiments, but on the contrary, is intended to cover various modifications and equivalent arrangements included within the spirit and the scope of the appended claims.

It is to be understood that the offset pattern and/or the (modified) difference pattern may be subjected to post-processing before peak detection (cf. steps 54, 54' in FIG. 5). Such post-processing may involve different types of filtering, for noise removal and/or image enhancement.

The person skilled in the art realizes that there are other ways of generating formatted signal values based on the output signal. For example, each individual projection signal included in the output signal may be subjected to a high-pass filtering in the time domain, whereby the thus-filtered projection signals represent background-compensated energy/power and may be processed for generation of formatted signal values.

Still further, the difference pattern $da_t$ may be obtained in other ways than using data obtained in a single previous frame. For example, the change values $ds_t$ may be generated as a function of a difference between a current projection value $I_t$ and a temporally low-pass filtered projection value $\overline{I_{t-k}}$, e.g. $ds_t = \log(\overline{I_{t-k}}) - \log(I_t)$, where $\overline{I_{t-k}}$ may be computed using any temporal low-pass filter. One such example is an exponential forget filter: $\overline{I_{t-k}} = \overline{I_{t-k-1}} - \in \cdot (I_t - \overline{I_{t-k-1}})$, where $0 < \in \leq 1$. It is also possible to compute $\overline{I_{t-k}}$ using a moving average, etc. In all of these examples, k may have any suitable number, including 0. It is thus understood that $\overline{I_{t-k}}$ may be calculated as a function of the projection values in a plurality of preceding iterations (and possibly the current iteration), so as to represent the projection value at an earlier time point, where the time period between the current time point and the earlier time point corresponds to the time scale in the change values $ds_t$, and thus the difference pattern $da_t$.

Analogously, the difference pattern may be generated as a difference between a current total attenuation pattern and a temporally low-pass filtered (pixel-by-pixel) total attenuation pattern: $da_t = a_t - \overline{a_{t-k}}$, where k may have any suitable number, including 0.

Still further, it is conceivable to generate difference patterns for more than one time difference in order to improve the detection of weak touches. For example, a first difference pattern may be tailored to accurately capture medium velocity movements and a second difference pattern may be designed to capture fast movements. Here, the first difference pattern may represent a longer time difference than the second difference pattern.

Furthermore, all the above embodiments, examples, variants and alternatives given with respect to an FTIR system may be equally applicable to a touch-sensitive apparatus that operates by transmission of other energy than light. In one example, the touch surface may be implemented as an electrically conductive panel, the emitters and sensors may be electrodes that couple electric currents into and out of the panel, and the output signal may be indicative of the resistance/impedance of the panel on the individual detection lines. In another example, the touch surface may include a material acting as a dielectric, the emitters and sensors may be electrodes, and the output signal may be indicative of the capacitance of the panel on the individual detection lines. In yet another example, the touch surface may include a material acting as a vibration conducting medium, the emitters may be vibration generators (e.g. acoustic or piezoelectric transducers), and the sensors may be vibration sensors (e.g. acoustic or piezoelectric sensors).

The invention claimed is:

1. A method of enabling touch determination based on an output signal from a touch-sensitive apparatus, the touch-sensitive apparatus including a panel, and being configured to conduct signals from a plurality of incoupling points to a plurality of outcoupling points, thereby defining detection lines that extend across a surface portion of the panel between pairs of incoupling and outcoupling points, and including at least one signal generator coupled to the incoupling points to generate the signals, and at least one signal detector coupled to the outcoupling points to generate the output signal which is indicative of one or more objects touching the surface portion, the method comprising, in a sequence of iterations:

obtaining, based on the output signal, a current signal value for each detection line;

generating a first interaction pattern and a second interaction pattern as a function of the current signal values, such that the first and second interaction patterns are reconstructed two-dimensional distributions of local interaction with the conducted signals across the surface portion; and jointly processing the first and second interaction patterns to determine current touch data representing said one or more objects on the surface portion, the jointly processing including identifying a first set of peaks in the first interaction pattern and identifying a second set of peaks in the second interaction pattern, and determining the current touch data from the first and second sets of peaks, wherein the first and second interaction patterns are generated to represent changes in interaction on different time scales.

2. The method of claim 1, wherein the first interaction pattern is generated to represent a factual touch interaction across the surface portion at a current iteration; and the second interaction pattern is generated to indicate temporal changes in interaction caused by adding a further object to the surface portion, movement of said one or more objects on the surface portion and removal of said one or more objects from the surface portion.

3. The method of claim 1, wherein
the second interaction pattern is generated to represent changes in interaction occurring on a time scale in the approximate range of 5 ms-5 s; and
the first interaction pattern is generated to represent changes on a longer time scale than the second interaction pattern.

4. The method of claim 1, wherein the second interaction pattern is generated to represent a change in accumulated interaction on the surface portion between a current iteration and a preceding iteration.

5. The method of claim 1, wherein the second interaction pattern is generated to represent a difference between an accumulated interaction on the surface portion at a current iteration and a time average of accumulated interaction on the surface portion.

6. The method of claim 1, wherein said generating the second interaction pattern comprises:
retrieving a current reference value for each detection line, the current reference value being representative of the current signal value obtained in one or more preceding iterations in the sequence of iterations;
calculating a change value for each detection line as a function of the current signal value and the current reference value; and
operating a reconstruction function on the change values to generate the second interaction pattern.

7. The method of claim 1, wherein said jointly processing further comprises:
matching the first set of peaks identified in the first interaction pattern and the second set of peaks identified in the second interaction pattern to touch data of existing touches stored in a history list; and
updating the history list based on said matching.

8. The method of claim 7, wherein the identifying identifies said first and second sets of peaks in the first and second interaction patterns that are generated in a current iteration.

9. The method of claim 7, wherein the identifying comprises:
identifying said first set of peaks in the first interaction pattern generated in a preceding iteration; and
identifying said second set of peaks in the second interaction pattern generated in a current iteration.

10. The method of claim 7, wherein said updating comprises, for each existing touch that matches at least one peak in the first and second sets of peaks;
determining current touch data as a function of said at least one peak; and
changing the touch data in the history list to reflect the current touch data.

11. The method of claim 10, wherein, if the existing touch matches a first peak in the first set of peaks and a second peak in the second set of peaks, the determining the current touch data includes
applying a set of heuristics which is dependent on at least one of an estimated velocity of the existing touch and a distance between the first and second peaks.

12. The method of claim 11, wherein the set of heuristics comprises at least one of
a high velocity heuristic which causes the current touch data to be determined as a function of the second peak and not the first peak,
an intermediate velocity heuristic which causes the current touch data to be determined as a function of the first peak and the second peak,
a low velocity heuristic which causes the current touch data to be determined as a function of the first peak and not the second peak,
a large distance heuristic which causes the current touch data to be determined as a function of the second peak and not the first peak,
an intermediate distance heuristic which causes the current touch data to be determined as a function of the first peak and the second peak, and
a small distance heuristic which causes the current touch data to be determined as a function of the first peak and not the second peak.

13. The method of claim 1, wherein the generating first and second interaction patterns comprises:
generating formatted input data as a function of the current signal values; and
operating at least one reconstruction function on the formatted input data,
wherein the formatted input data represents signal attenuation.

14. A non-transitory computer-readable storage medium comprising computer code which, when executed on a data-processing system, is adapted to carry out the method of claim 1.

15. A method of enabling touch determination based on an output signal from a touch-sensitive apparatus, the touch-sensitive apparatus including a panel, and being configured to conduct signals from a plurality of incoupling points to a plurality of outcoupling points, thereby defining detection lines that extend across a surface portion of the panel between pairs of incoupling and outcoupling points, and including at least one signal generator coupled to the incoupling points to generate the signals, and at least one signal detector coupled to the outcoupling points to generate the output signal which is indicative of one or more objects touching the surface portion, the method comprising:
obtaining, based on the output signal, a current signal value for each detection line;
generating a first interaction pattern and a second interaction pattern as a function of the current signal values, such that the first and second interaction patterns are reconstructed two-dimensional distributions of local interaction with the conducted signals across the surface portion;
wherein the first and second interaction patterns are generated to represent changes in interaction on different time scales; and
wherein said generating the second interaction pattern includes
enhancing weak interactions over strong interactions in the second interaction pattern.

16. The method of claim 15, further comprising:
obtaining a measured change in interaction for each detection line; and
wherein said enhancing interactions includes
actively modifying the measured change in interaction for at least a subset of the detection lines.

17. The method of claim 16, wherein said enhancing comprises:
relatively decreasing the measured change for the detection lines with a highest measured change.

18. The method of claim 16, wherein said enhancing comprises:

applying a re-scaling function to the measured change for the detection lines.

19. A device for enabling touch determination based on an output signal from a touch-sensitive apparatus, the touch-sensitive apparatus including a panel, and being configured to conduct signals from a plurality of incoupling points to a plurality of outcoupling points, thereby defining detection lines that extend across a surface portion of the panel between pairs of incoupling and outcoupling points, and including at least one signal generator coupled to the incoupling points to generate the signals, and at least one signal detector coupled to the outcoupling points to generate the output signal which is indicative of one or more objects touching the surface portion, said device comprising:

a signal processor configured to obtain, based on the output signal, a current signal value for each detection line, generate a first interaction pattern and a second interaction pattern as a function of the current signal values, such that the first and second interaction patterns are reconstructed two-dimensional distributions of local interaction with the conducted signals across the surface portion, and jointly process the first and second interaction patterns to determine current touch data representing said one or more objects on the surface portion, by identifying a first set of peaks in the first interaction pattern and identifying a second set of peaks in the second interaction pattern, and determining the current touch data from the first and second sets of peaks, wherein the first and second interaction patterns are generated to represent changes in interaction on different time scales.

\* \* \* \* \*